(12) United States Patent
Dunne et al.

(10) Patent No.: US 7,941,412 B2
(45) Date of Patent: May 10, 2011

(54) PRESENTING EVIDENTIARY INFORMATION

(76) Inventors: Monica Mary Dunne, Redland Bay (AU); Ian Chivers, Redland Bay (AU)

( * ) Notice: Subject to any disclaimer, the term of this patent is extended or adjusted under 35 U.S.C. 154(b) by 795 days.

(21) Appl. No.: 11/873,230

(22) Filed: Oct. 16, 2007

(65) Prior Publication Data

US 2009/0100067 A1    Apr. 16, 2009

(51) Int. Cl.
*G06F 17/30* (2006.01)
*G06F 7/00* (2006.01)
(52) U.S. Cl. ......... 707/694; 707/783; 707/942; 705/311
(58) Field of Classification Search .................... 705/311
See application file for complete search history.

(56) References Cited

U.S. PATENT DOCUMENTS

| | | | | |
|---|---|---|---|---|
| 5,159,180 A * | 10/1992 | Feiler | ............................ | 235/375 |
| 5,838,966 A * | 11/1998 | Harlan | ........................... | 715/866 |
| 5,903,646 A * | 5/1999 | Rackman | ........................ | 705/51 |
| 5,940,800 A * | 8/1999 | Bennett et al. | ................. | 705/311 |
| 7,086,085 B1 * | 8/2006 | Brown et al. | ....................... | 726/7 |
| 7,162,428 B1 * | 1/2007 | Rosenthal et al. | ............ | 705/300 |
| 7,197,704 B1 * | 3/2007 | Yahara | ........................... | 715/210 |
| 7,197,716 B2 * | 3/2007 | Newell et al. | ................... | 715/760 |
| 7,249,026 B1 * | 7/2007 | Bennett et al. | ................. | 705/311 |
| 7,324,997 B2 * | 1/2008 | Yamada | ................................ | 1/1 |
| 7,664,655 B2 * | 2/2010 | Rosenthal et al. | ............. | 705/1.1 |
| 7,711,738 B1 * | 5/2010 | Kraft et al. | ..................... | 707/752 |
| 7,761,427 B2 * | 7/2010 | Martin et al. | .................. | 707/661 |
| 2002/0123902 A1 * | 9/2002 | Lenore et al. | ...................... | 705/1 |
| 2002/0173975 A1 * | 11/2002 | Leventhal | ......................... | 705/1 |
| 2003/0046290 A1 * | 3/2003 | Yamada | ........................... | 707/10 |
| 2004/0019496 A1 * | 1/2004 | Angle et al. | ....................... | 705/1 |
| 2005/0027750 A1 * | 2/2005 | Martin et al. | .................. | 707/200 |
| 2005/0166139 A1 * | 7/2005 | Pittman et al. | ................. | 715/511 |
| 2005/0240861 A1 * | 10/2005 | Upchurch et al. | ............. | 715/509 |
| 2007/0055532 A1 * | 3/2007 | Jneid | .................................. | 705/1 |
| 2007/0112584 A1 * | 5/2007 | Rosenthal et al. | ................. | 705/1 |
| 2007/0260472 A1 * | 11/2007 | Bennett et al. | ..................... | 705/1 |
| 2007/0265871 A1 * | 11/2007 | Bennett et al. | ..................... | 705/1 |
| 2008/0015885 A1 * | 1/2008 | Bennett et al. | ..................... | 705/1 |
| 2010/0153127 A1 * | 6/2010 | Rosenthal et al. | ............. | 705/1.1 |

FOREIGN PATENT DOCUMENTS

WO    WO-2009/132377 A1 * 11/2009

OTHER PUBLICATIONS

Strand, R.G. "The Computer-Integrated Courtroom—A Demonstration", Federal Judicial Center, Conference of Chief District Judges, Apr. 6, 1989.*
Smith, T. and I. Chivers "The Estate Mortgage Court System", slide presentation, Mar. 23, 1998.*

(Continued)

*Primary Examiner* — Luke S Wassum

(57) ABSTRACT

The invention concerns the presentation of evidentiary information on computer generated interfaces within secure user groups. For example presenting evidence a courtroom to the judge, witness and legal representatives of the plaintiff and defendant simultaneously on computer display screens. All presenting of evidence is done using a website interface where each user logs in and their log in provides them with functionalities that reflect their role in the legal proceedings. The invention makes presenting evidence easier by allowing evidence to be ordered, facilitating private data, being able to hold on to evidence or to cause evidence to be presented to a particular user or team of users. Aspects of the invention include a set of interfaces, computer systems, methods and application software.

14 Claims, 20 Drawing Sheets

OTHER PUBLICATIONS

Ambrogi, R.J. "Software Solutions that Skip the Software", Legal Online, Col. No. 57, Oct. 1999.*
Altman, R.B. "PowerPoint 2000/98: Visual QuickStart Guide", Berkeley:Peachpit Press, excerpts from chapters 13 and 17, ISBN 978-0-201-35441-6, May 7, 1999.*
Parliament of Victoria Law Reform Committee "Technology & Law", government report, May 1999.*
Einstein, C. "Technology in the Court Room-2001—[Friend or Foe?]", downloaded from www.lawlink.nsw.gov.au/lawlink/supreme_court/II_sc.nsf/vwPrintl/SCO_speech_einstein_201101, 2001.*
Hilly, E. "An Australian Player in the Law and Technology Game: Ringtail", 2003.*
Granger, B.T. "Using Summation iBlaze in the Courtroom—Better Lawyer, Better Judge, Better Justice—The Need for Judicial Leadership", Dec. 21, 2004.*
Systematics "System@Law Benchmark captures your case", product brochure, downloaded from www.systematics.com.au, May 29, 2005.*
Systematics "Version 4.3—Oct. 2005!", downloaded from www.systematics.com.au, Sep. 15, 2005.*
Allen, J. "A Rose by Any Other Name—A Review of Ringtail Casebook", Law Office Computing, undated, but no later than Aug. 21, 2006.*
Systematics "System@Law Court makes your case", product brochure, downloaded by www.systematics.com.au, Aug. 26, 2006.*
Systematics "System@Law Signature tames litigation tigers", product brochure, downloaded from www.systematics.com.au, Aug. 26, 2006.*
Systematics "System@Law Echo cuts appeal clutter", product brochure, downloaded from www.systematics.com.au, Aug. 26, 2006.*
MacDonald, R.M., M. Burdon and S.M. Jackson "Ensuring the Integrity of the E-Court Process", Proceedings of the Justice Environments Conference, 2006, pp. 1-12.*
Jackson, S. "Keeping it Simple: Court-Privided Technology Brings the 'Electronic Trial' to the Ordinary Litigant", Bond Law Review, vol. 20, No. 1, 2008.*
FTI Technology "Ringtail® Legal", product prochure, 2009.*
Systematics "Systematics Court—New horizons in evidence management", product brochure, Jul. 20, 2010.*
Systematics "Sample Projects", downloaded from www.syatematics.com.au, Jul. 20, 2010.*
Systematics "Cases in which Systematics Court has been deployed", downloaded from www.systematics.com.au, Jul. 20, 2010.*
Supreme Court of South Australia "*Harris Scarfe Ltd* v. *Ernst & Young* (No. 4)" [2005] SASC 443, Nov. 25, 2005.*
Supreme Court of South Australia "*Harris Scarfe Ltd* v. *Ernst & Young* (No. 8)" [2006] SASC 317, Oct. 10, 2006.*
Supreme Court of South Australia "*Harris Scarfe Ltd* v. *Ernst & Young* (No. 9)" [2006] SASC 323, Oct. 20, 2006.*
James, C. "Harris Scarfe Back in the Court Room Five Years on; Receiver Wants $220m for Audit 'Negligence'", The Advertiser (Australia), State Edition, Finance, Oct. 21, 2006, p. 94.*
Supreme Court of South Australia "*Harris Scarfe Ltd* v. *Ernst & Young* (No. 10)" [2006] SASC 325, Oct. 26, 2006.*
Supreme Court of South Australia "*Harris Scarfe Ltd* v. *Ernst & Young* (No. 11)" [2006] SASC 389, Dec. 20, 2006.*
May, L. and M. Burdon "Information Protection Management Structures in Australian E-courts", Journal of Theoretical and Applied Electronic Commerce Research, vol. 1, No. 3, Dec. 2006, pp. 58-67.*
Jackson, S. "New Challenges for Litigation in the Electronic Age", Deakin Law Review, vol. 12, No. 1, 2007.*
Systematics, System @ Law Court Makes Your Case, brochure, date unknown, 1 page.
Systematics, "Systematics Court New horizons in evidence management", brochure, date unknown, 1 page.
Systematics, "Systematics—Sample Projects", website, Aug. 13, 2010, 3 pages.
Supreme Court of South Australia, "*Harris Scarfe & Ors* v. *Ernst & Young & Ors* (NO3)", Oct. 28, 2005, 12 pages.

* cited by examiner

Fig. 14

PRESENTING EVIDENTIARY INFORMATION

TECHNICAL FIELD

The invention concerns the presentation of evidentiary information on computer generated interfaces within secure user groups, specifically but not limited to, the presentation of evidentiary information in a courtroom. Aspects of the invention include a set of interfaces, computer systems, methods and application software.

BACKGROUND ART

Legal proceedings of a courtroom or tribunal frequently refer to evidentiary information that the Judge, witness, the legal representatives of the plaintiff and the defendant wish to consider simultaneously.

Usually every person has a paper copy of each of the documents that may be referenced in the proceedings. For example, when counsel refers to a specific statutory declaration counsel must wait to ensure that everyone else in the proceedings has located their copy of the declaration before they can continue. This introduces significant time delays into the proceedings which in turn significantly impacts on the length of these proceedings.

Private documents also are referenced in these proceedings such as pre-hearing analysis of evidence, annotated versions of previously reviewed evidence and plans for conduct of the case. For example, the legal representative team of the plaintiff may include counsel and multiple solicitors that all wish to refer to one of these private documents during the proceedings.

SUMMARY OF THE INVENTION

In a first aspect the invention is a computer system to provide a set of computer generated interfaces for presenting evidentiary information to users of a secure user group, the computer system comprising:
  a data store to store a set of items of evidentiary information and an indication of the order of the items within the set; and
  a processor to access the data store to send to a first interface of at least one user a summary of the set of items in the order; to receive a request from the at least one user using the first interface to present the items in the order, and following receipt of a request to present an item, to access the data store to automatically send to the interfaces of the other users of the secure user group the item for presentation on the other interfaces in the order.

The data store may store a plurality of items of evidentiary information and the set of items may be the items in the data store that are associated with a same stored tag. There may be a plurality of tag types and there may be a plurality of sets of items. In the data store the item may have associated more than one type of tag. The processor may further operate to receive from the at least one user using the first interface a request for a tag to be associated with an item. The processor may further operate to receive from the at least one user using the first interface a request for the creation of a new tag type.

The processor may further operate to receive the indication of the order of the items within the set from a user using an interface. The indication may be received from the interface that received the summary of the set of items in the order for presentation. The processor may further operate to receive an amendment to the indicated order.

A separate request may be received to present an item for each item in the set.

The secure user group may be users each having authority to view the items. The group may be secured by authentication of each user using a password and user name. The authentication may determine whether an interface is able to receive a request to present the items in order.

The interface may be an online interface, such as a website. The computer system may be located remotely to the court room, tribunal or similar environment where the evidentiary information is presented.

An item of evidentiary information includes, but is not limited to, sound recordings, images, bibliographic data (meta data), maps, plans, drawings or photographs. Presentation of an item of evidentiary information is the rendering of the item in a way that it can be seen or heard by the user.

The at least one user may be a legal representative of the plaintiff or defendant in legal proceedings. The username may be common to all members of a legal representative team.

More than one interface of the set of interfaces may be able to receive a request to present an item.

In a second aspect the invention is a set of computer generated interfaces for presenting evidentiary information to a secure user group, each user having at least one separate interface, wherein at least one interface is operable to receive an indication of an order of evidentiary information items within a set of items, to present a summary of the set of items in the indicated order and to receive requests to present each item to the other users in the secure user group in the order, wherein following a request received from the at least one interface to present an item to the other users, one interface of each of the other users automatically present the item in the order.

Other aspects of the invention defined by the first and second aspects is software installed on the computer system to be operable in the manner described. Further, a method of controlling the computer generated interfaces for presenting items to a secure user group in the manner described above.

A third aspect of the invention includes a method of presenting evidentiary information to a secure user group on a set of computer generated interfaces, comprising the steps of:
  storing in a first data store an item of evidentiary information;
  storing in the first data store or a second data store first private information of a first user relating to the item and associating the first private information with the item;
  wherein on request to present simultaneously the item to the first user and a second user,
  retrieving the item from the first data store;
  retrieving the first private information from the first or second data store;
  sending at least the first private information to the interface of a first user for presentation using the interface; and
  sending the item to the interface of the second user for presentation using the interface.

The private information may be an annotated version of the item.

Alternatively or in addition, the first private information may be observations relating to the item, such as comments, identified legal issues relating to the item or grouping tags.

The method may further comprise the step of sending the item to the first user.

The second data store may be remote from the first data store, such as local storage of the computer system of the first user. The step of retrieving the first private information may comprise retrieving the first private information from the remote second data store using an Internet connection. The step of retrieving the first private information may comprise authenticating with the second data store.

Alternatively, the first and second data store may be combined in the same physical storage device.

The method may further comprise determining whether the first private information is a an annotated version of the item and if so, selecting the annotated version for presentation on the interface. The method may further comprise receiving a request to present an annotated or non-annotated version of the item currently presented on the interface.

The method may further comprise storing in the first data store or a third data store second private information of the second user relating to the item and associating the second private information with the item; wherein on request to present the item to the first user and the second user simultaneously, retrieving the second private information from the first or third data store; and sending the second private information to the second user for presentation using the interface.

The first and second user may each comprise a plurality of users having a separate interface.

The method may further comprise authenticating the user, wherein the authentication determines the requests an interface of the user can receive, items the interface of the user can present and private information the interface of the user can present. The authentication is associated with the user's role secure user group, such as their role in the legal proceedings.

Where the item includes a document and bibliographic data and a third user is a witness, the method further comprises sending only the document to the interface of a user for presentation using the interface.

In a fourth aspect the invention is a set of computer generated interfaces for presenting evidentiary information to a secure user group, each user having at least one separate interface, wherein at least one interface is operable to receive a request to present an item of evidentiary information to the users in the secure user group, wherein following the request, one interface of all users presents the item and any private information associated with the item and private to that user.

Further aspects of the invention described by the third and fourth aspect is a computer system and software to perform the method.

In a fifth aspect the invention is a set of at least three computer generated interfaces for presenting evidentiary information to a secure user group, each user having at least one separate interface, wherein a first interface is operable to receive a request to present an item of evidence to the second and third interface, and a second interface is operable to prevent the presentation of a new item of evidence, wherein following a request to present the item, the third interface presents the item and the item is not presented on the second interface.

A user may have a second and a third interface. A user may have multiple second interfaces.

Further aspects of the fifth aspect of the invention include software, method and a computer system.

In a sixth aspect the invention is a set of at least three computer generated interfaces for presenting evidentiary information to a secure user group, each user having at least one separate interface, wherein the first interface is operable:
to receive a request to present an item of evidentiary information to the second and third interface, wherein following a request to present the item to the second and third interface, the second and third interfaces present the item; and
to receive a request to present the item to only the second interface wherein following a request to present the item to only the second interface, only the second interface presents the item.

The second and third interface may be operable in the same way as the first interface.

The second interface may be an interface that is shared by a set of users. A request to present the item on an interface may comprise selecting an individual user or a set of users.

Further aspects of the sixth aspect of the invention includes software, a method and a computer system.

Of course, many aspects of the invention can be combined.

BRIEF DESCRIPTION OF THE DRAWINGS

An example of the invention will now be described with reference to the accompanying drawings, in which:

FIGS. 3 to 19 are example online computer generated interfaces of the invention.

BEST MODES OF THE INVENTION

Figure 2:
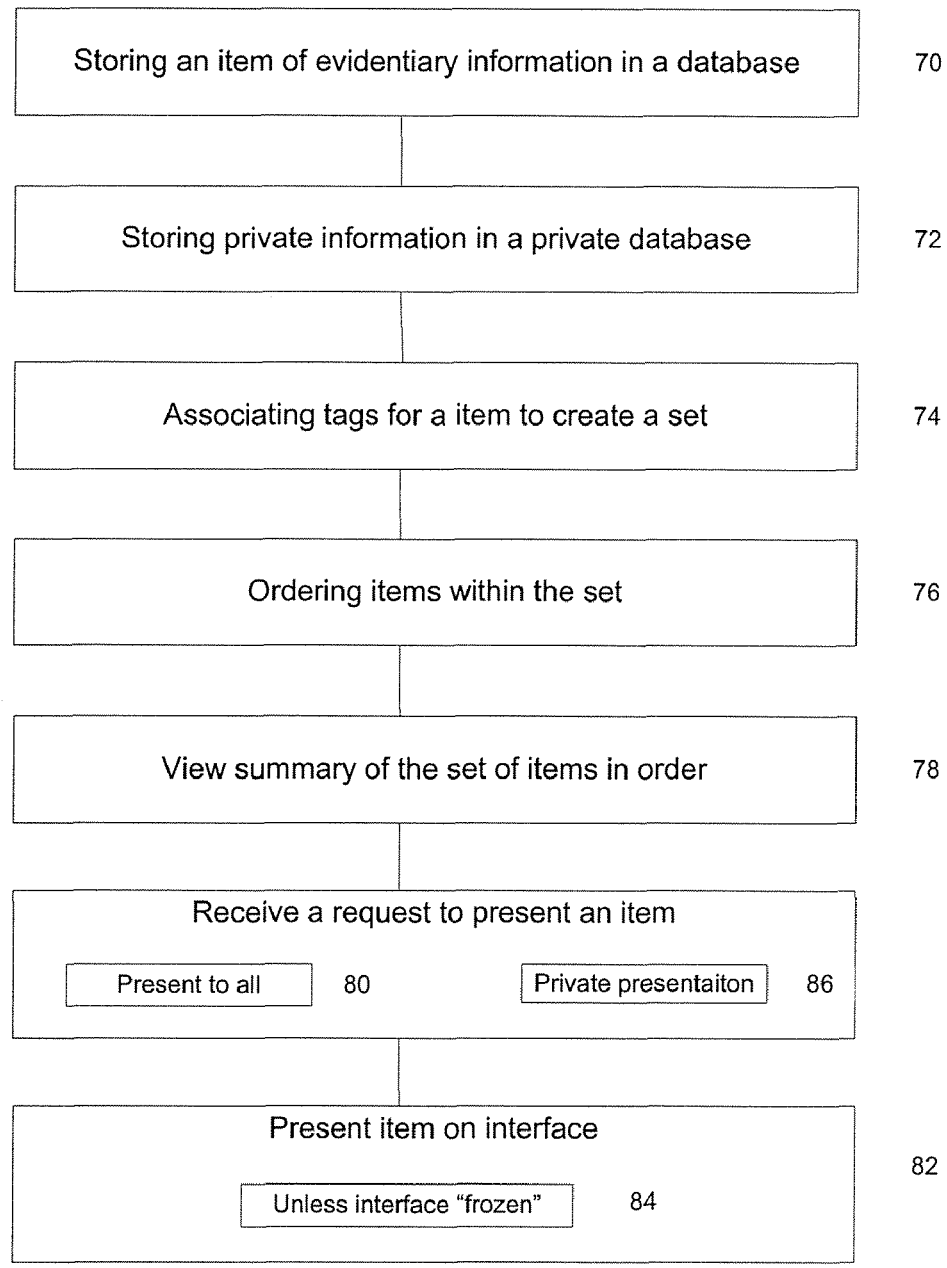
FIG. 2 is a flowchart of one embodiment of the invention.

An example of the invention as used in a courtroom during litigation proceedings will now be described. This example will be described with reference to the flow chart of FIG. 2. This flow chart shows the possible combination of all steps of the invention. As shown by the aspects of the invention described above, not all steps are essential for each aspect of the invention.

Figure 1:
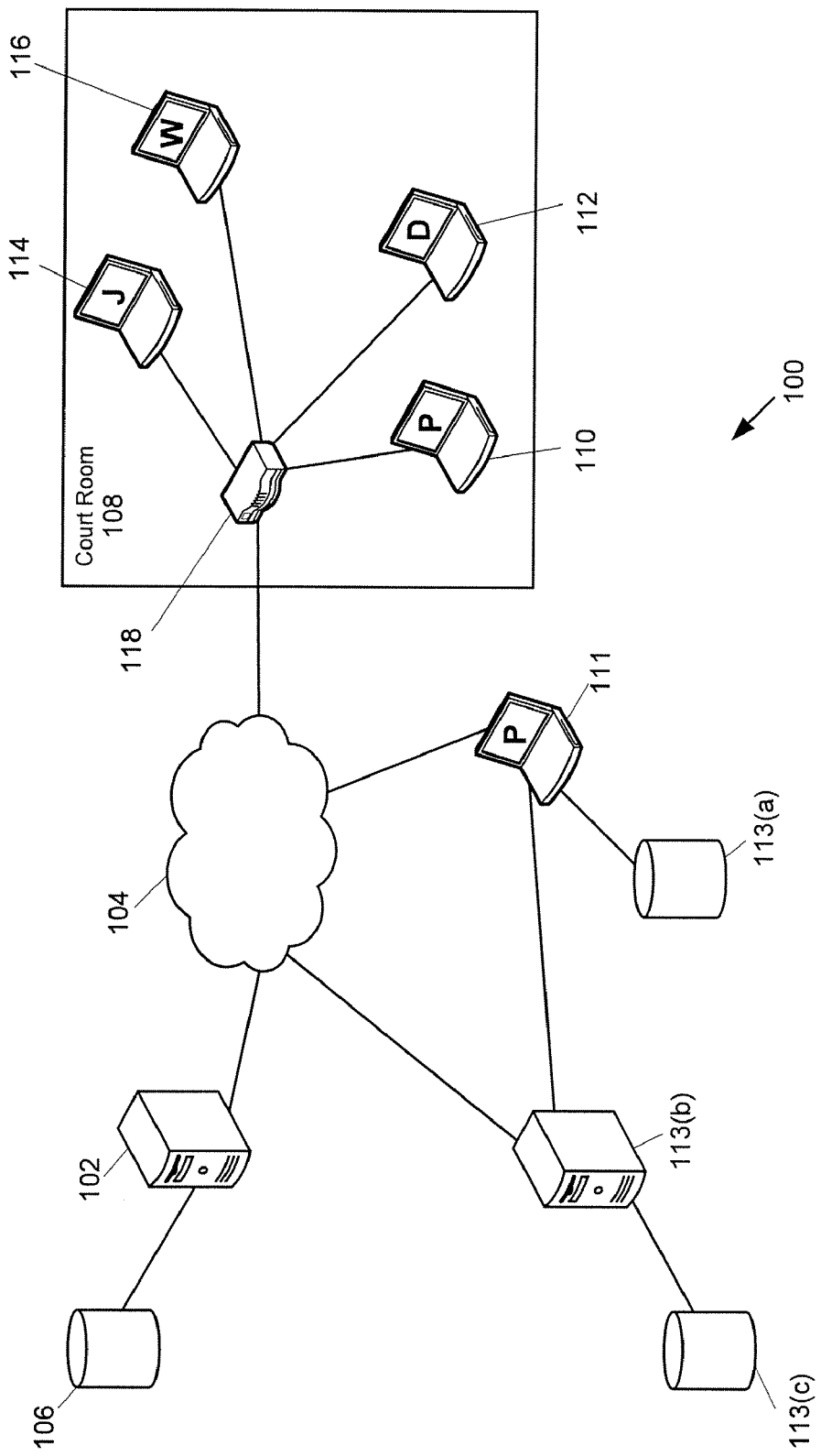
FIG. 1 is a schematic diagram of a computer system of the invention.

With reference to FIG. 1 a schematic diagram of a computer system 100 is shown. The computer system 100 comprises a server 102 that is connected to the Internet 104. The server 102 has communication ports to send and receive data and instructions. The server 102 includes storage means to store the application software that controls a processor of the server to perform the required processing step to provide the interfaces with the functionalities set out below. The server 102 has an associated data store 106, such as a database management system, that is responsible for storing the bulk of the evidentiary information that can be presented on the interfaces. The database 106 may store information for multiple cases but only one case will be discussed here. For each case, the data store 106 stores evidentiary information, such as documents, and user access authorisation information.

For each document, a graphic of the document is stored, such as a TIFF or JPEG file, public data associated with the document is also stored, and finally private information that can only be presented to the team of users in the proceedings that placed the private data on the data store.

The user computers located in a courtroom 108 are also shown. These computers 110 to 116 are all laptops in this example. Each laptop 110 to 116 is connected to a router 118 that provides internet connection to each laptop. The laptops 110 to 116 include a display device, such as an LCD screen on which the online computer interface of the invention can be displayed. The laptops 110 to 116 also include a mouse and keyboard through which the users can interact with the interface as will be described in further detail below in order to change the information presented on that user's interface and also the information presented in the interfaces of the other users. Each laptop has installed application software such as Internet Explorer within which the online computer generated interface can be displayed.

In this example, 110 is one or more laptops of the plaintiffs legal team (such as solicitor and barrister), 112 is one or more laptops of the defendant's legal team, 114 is the laptop of the Judge and 116 is the laptop of the witness. Each legal team and the Judge each separately comprise a set of users (or team). While each user within a set may be given a unique username and password combination, each user of a set may have the same authority level. That is, all users with the same set can see the same public and private information.

The online interface to the server 102 can be accessed outside the courtroom 108. For example, the legal practitioner of the plaintiff ("plaintiff") can use their laptop 110 or a different laptop 111 that also has Internet 104 access. Private information of the legal team can be stored on a private data store of the computer 111. Alternatively, the private information can be stored on a data store 113(*c*) of a server 113(*b*) that is connected to the laptop 111 either using the Internet 104 or as part of a Local Area Network (LAN) provided the LAN can also be accessed externally using the Internet.

Initially the database must be populated with the evidentiary information that is associated with the case. This can be done as part of the discovery process, either from the commencement of the legal proceedings or retrospectively, such as just before the court proceedings commence. Items are received and stored by the server 102 into the database 70. Depending on the settings given to an item of evidentiary information it can be made public to the other side and the Judge, or can remain private to the party adding the item until otherwise made public at a later date.

In this example evidentiary information is added to the database 106 by providing a copy of the information (either in paper or electronic form) to the server 102 administrator. The administrator operates the server to assign each item a unique identifier within the database. In the case of a document, this involves storing in the database associated with the unique identifier at least an electronic graphical representation of the document such as a TIFF file. Meta data can also be saved at this time.

The plaintiff may choose to add to the database 106 an annotated version of the document that is a separate file to the original bald document 72. In this case this version of the document would be private information that could only be visible to the user group that caused the document to be added. In this case, when the plaintiff presents an item a document their interface will present their annotated version, such as a TIFF version of a document with handwritten comments, in preference to the bald version of the document.

The computer generated interface can be accessed outside the courtroom. In this example the user wishing to access the interface is the legal representative of the plaintiff.

Figure 3:
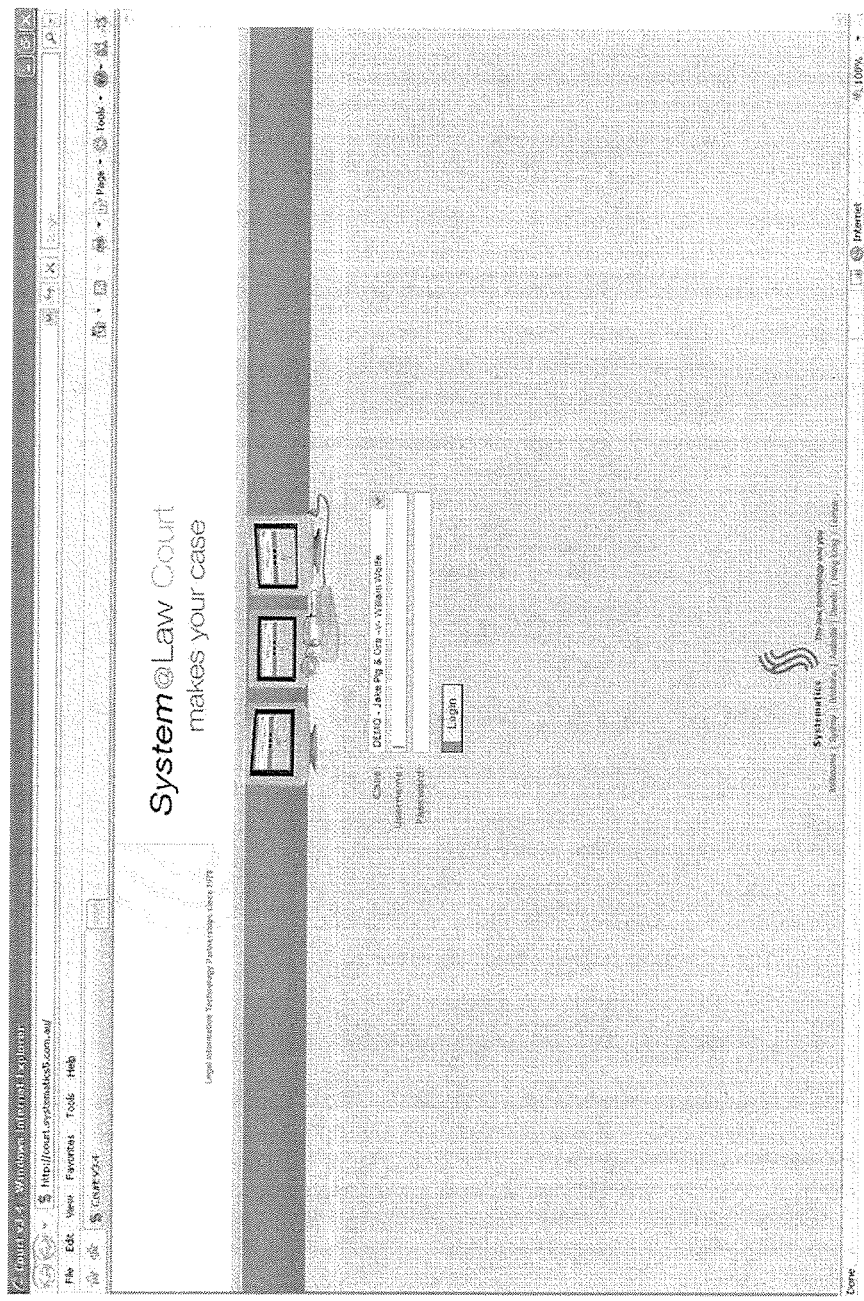

Using the computer 111, the plaintiff must use an Internet browser application software installed on the computer 111 in order to view the online interface and login to the server 102. Once the correct URL is entered a login display is presented within the Internet browser as shown in FIG. 3.

Figure 4:
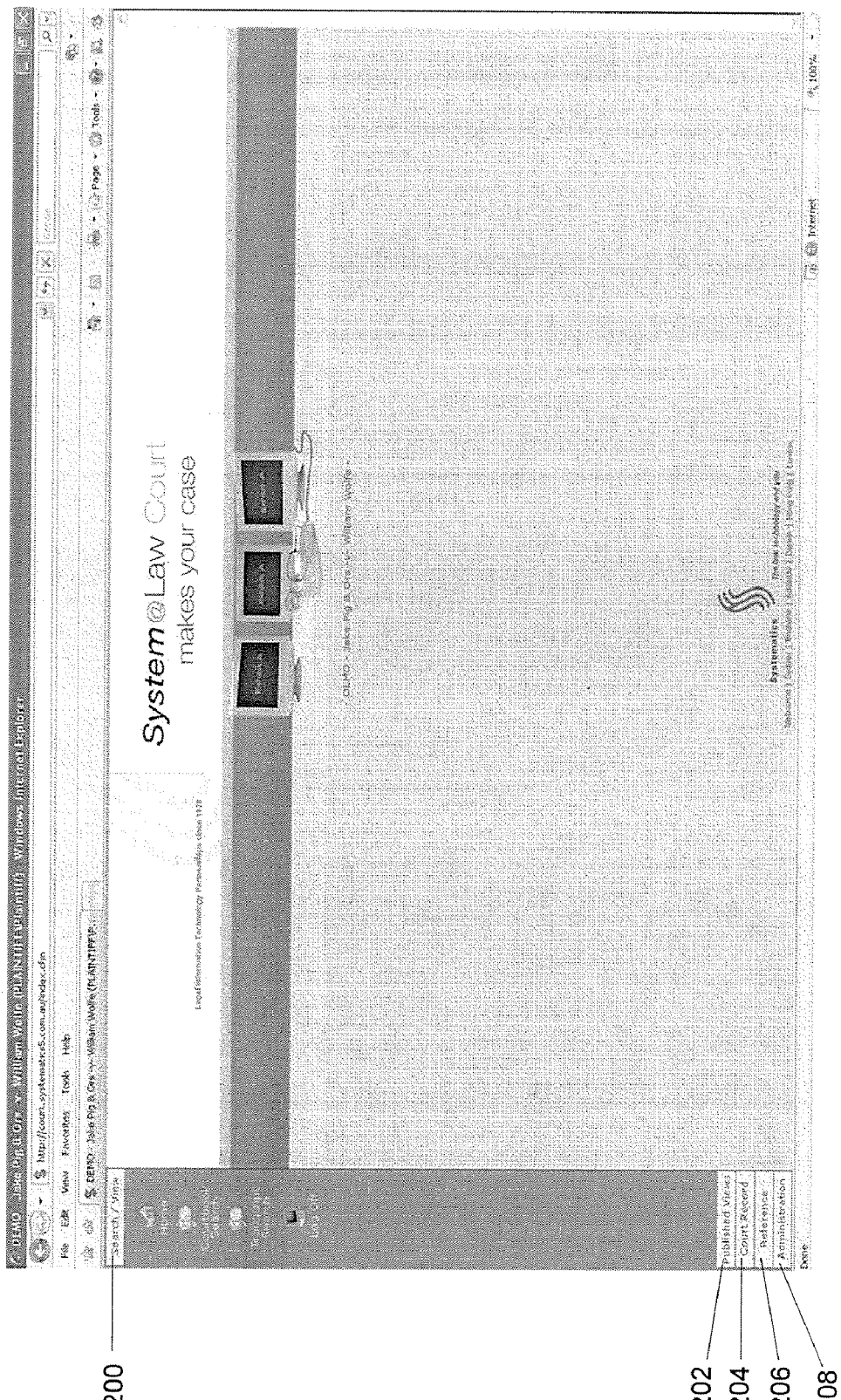

The plaintiff then enters their username and password and if correct is presented with the interface of FIG. 4. There are five modules listed on the side of the interface being search 200, published views 202, court record 204, reference 206 and administration 208. Each of these provide functionalities to the user some of which that relate to various features of the invention as claimed will be described here.

Once an item of evidentiary information has been stored in the data store 106 the plaintiff may wish to annotate an item with comments and other notes and store that information as private information 72.

The private information can be typed comments that are presented together with the item and can include things like observations about the item or planned questions about the item that can be asked in court. These annotations are only accessible by the team of users that made the annotations and this is controlled by the access permissions defined by the user's username and password.

Figure 5:
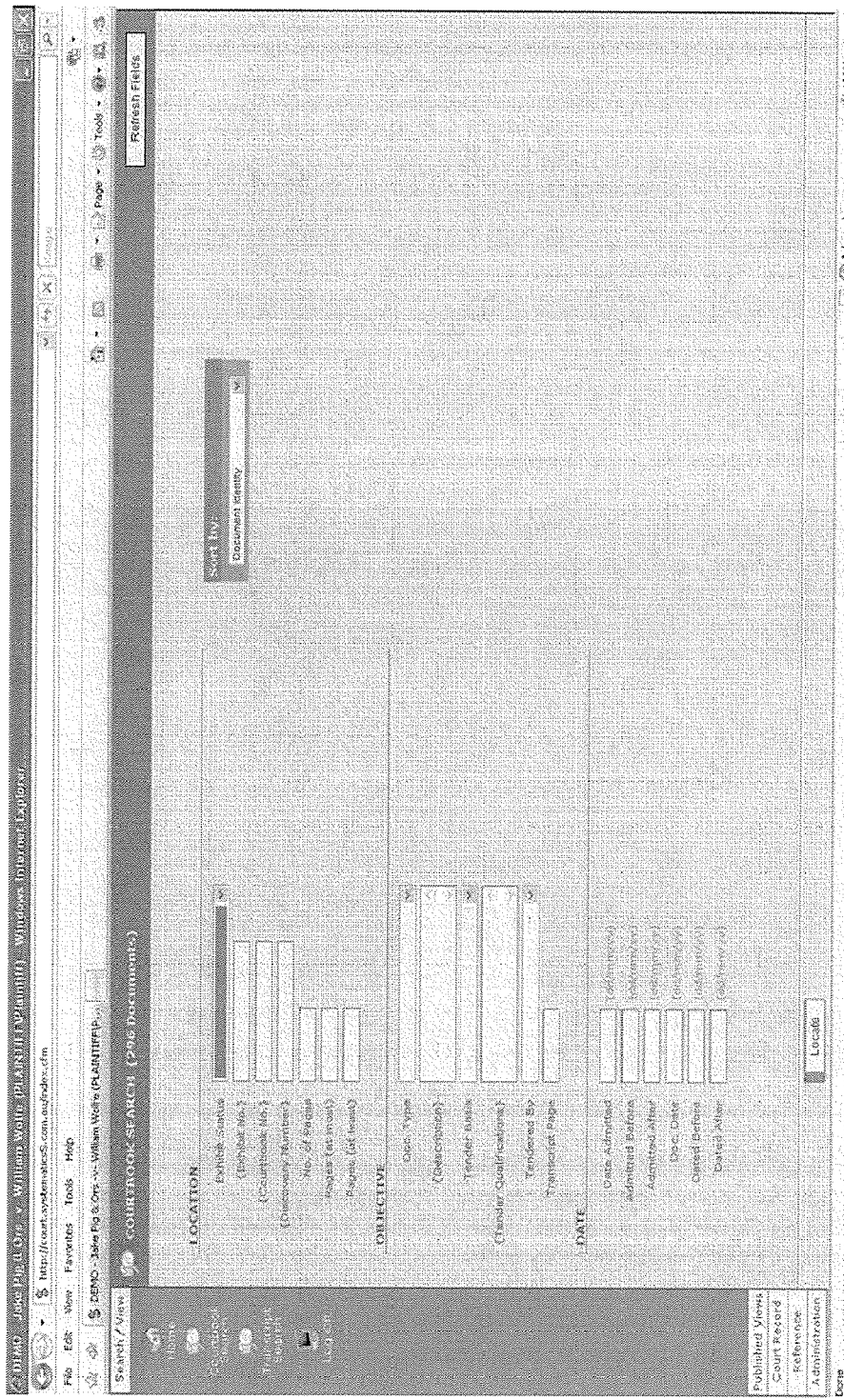
Figure 6:
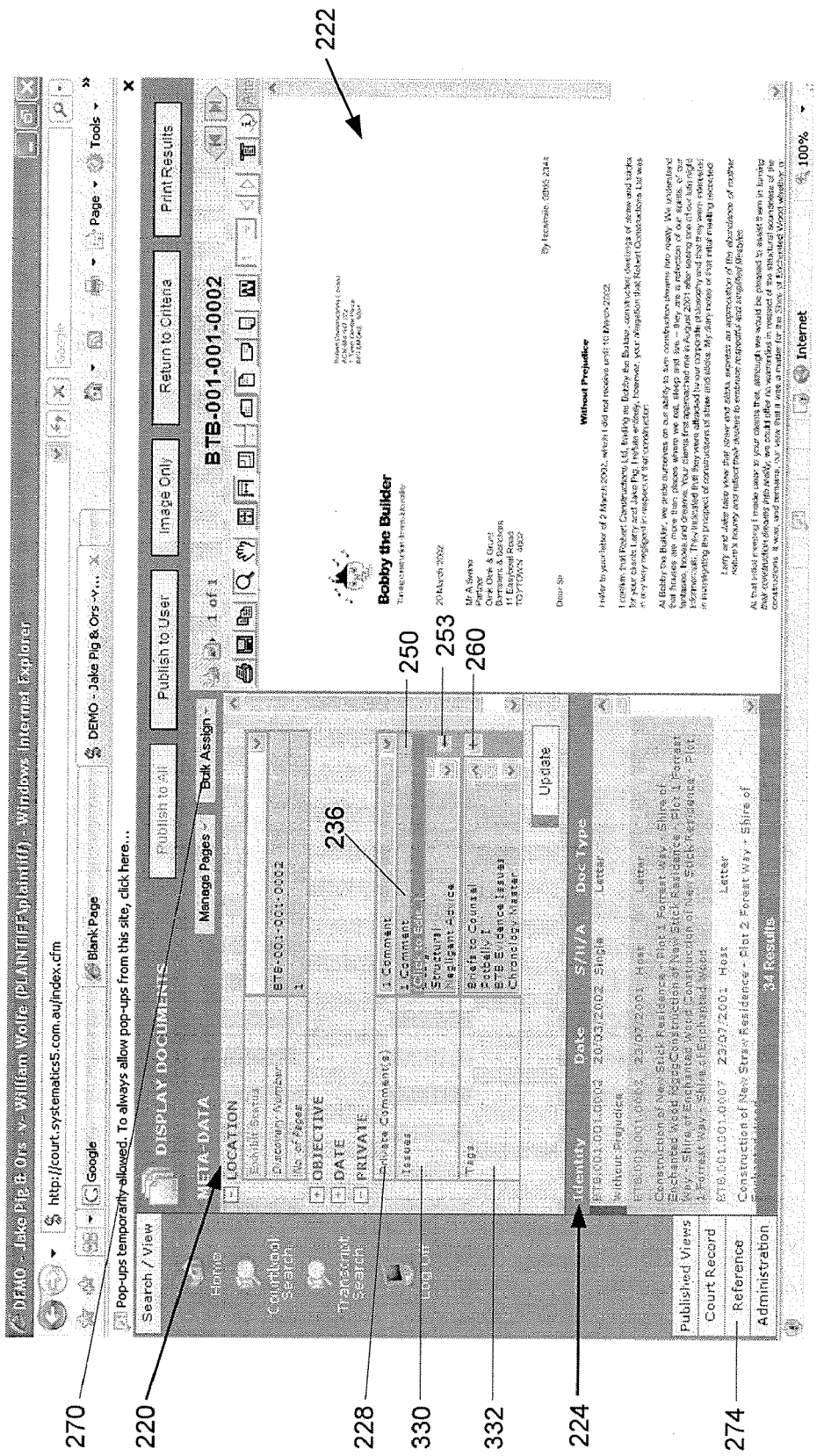

In order to add private information to an item, the item must first be located. By clicking on the search module 200 the simplified query interface is displayed to the plaintiff as shown in FIG. 5. The plaintiff populates the search fields to produce 34 search result as shown in FIG. 6. This results display is divided into three sections. The top left section 220 presents the meta data for the item currently presented, which in this case is the first item of the 34 results. The right hand section 222 presents an image of the item, which in this case is a document. The bottom left hand section 224 presents a summary list of the results of the search.

In this example, the plaintiff wishes to add private information to this first document. There are three categories of private information, the first is comments 228, the second is issues 330, and third is tags 332.

Figure 7:
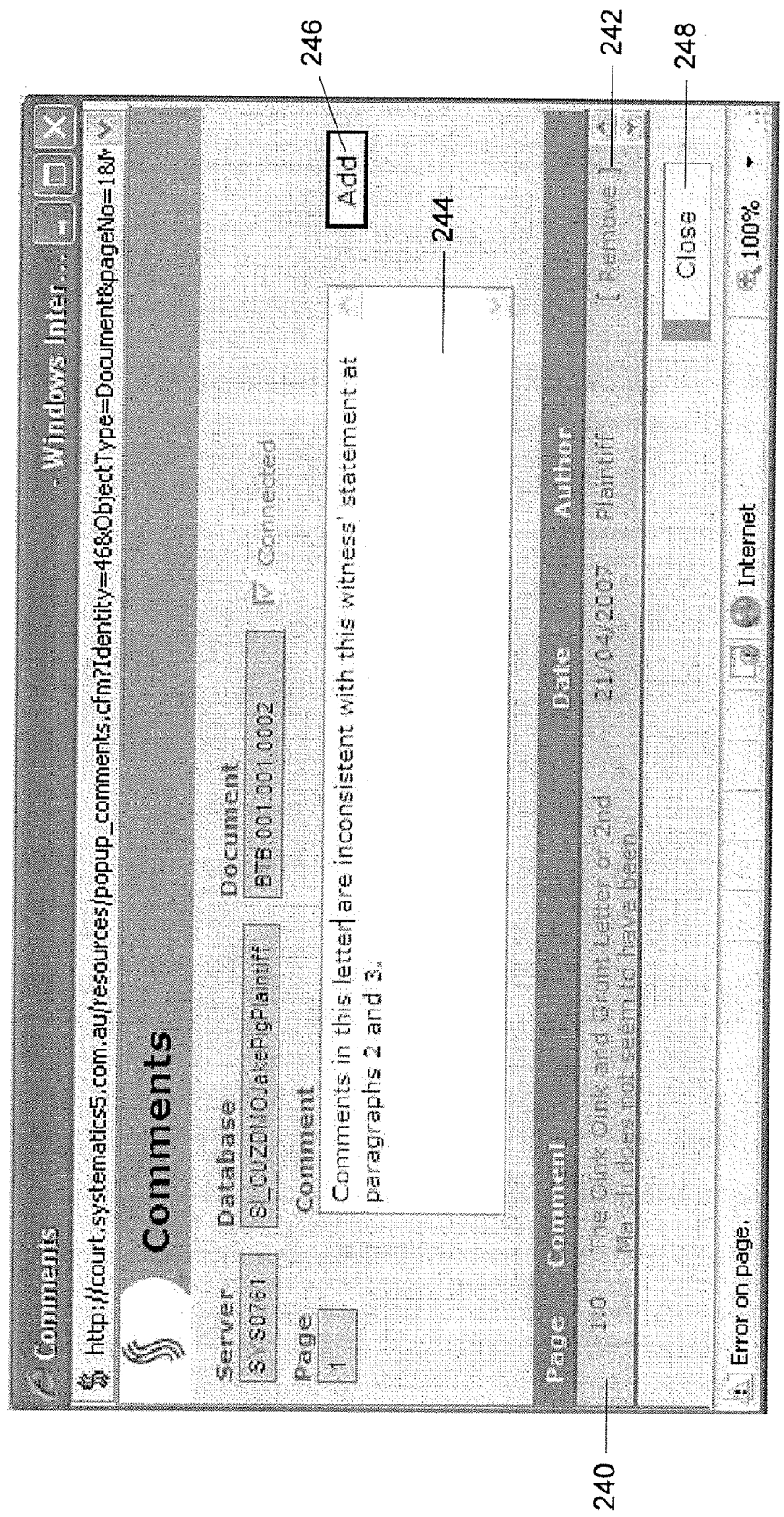

A comment 228 may be any text concerning the document, such as a possible advocacy question, a description of an identified inconsistency or other observation. Here there is one comment already added. To add a comment the plaintiff clicks "click to edit" 250 from the comment pick list 236. This causes the pop up window of FIG. 7 to be displayed. This popup window shows a summary of the comments that have been previously added at the bottom 240. In this case a comment on the letter was added by the plaintiff on 21 Apr. 2007. This comment can be deleted by clicking "remove" 242. The text of the new comment is typed in the box 244 and then "Add" 246 is clicked.

Then once this pop-up window is closed by clicking "close" 248 the plaintiff returns to the interface shown in FIG. 6 and the comments count will have increased to 2.

Issues 330 are matters of fact and law that are in contention between the parties. Coding items of evidentiary information with the issues effectively relates all items that pertain to a particular matter of fact or law. In combination with other search criteria issues can assist in refining searches. Issues can be included within hierarchies that are predefined.

Figure 8:
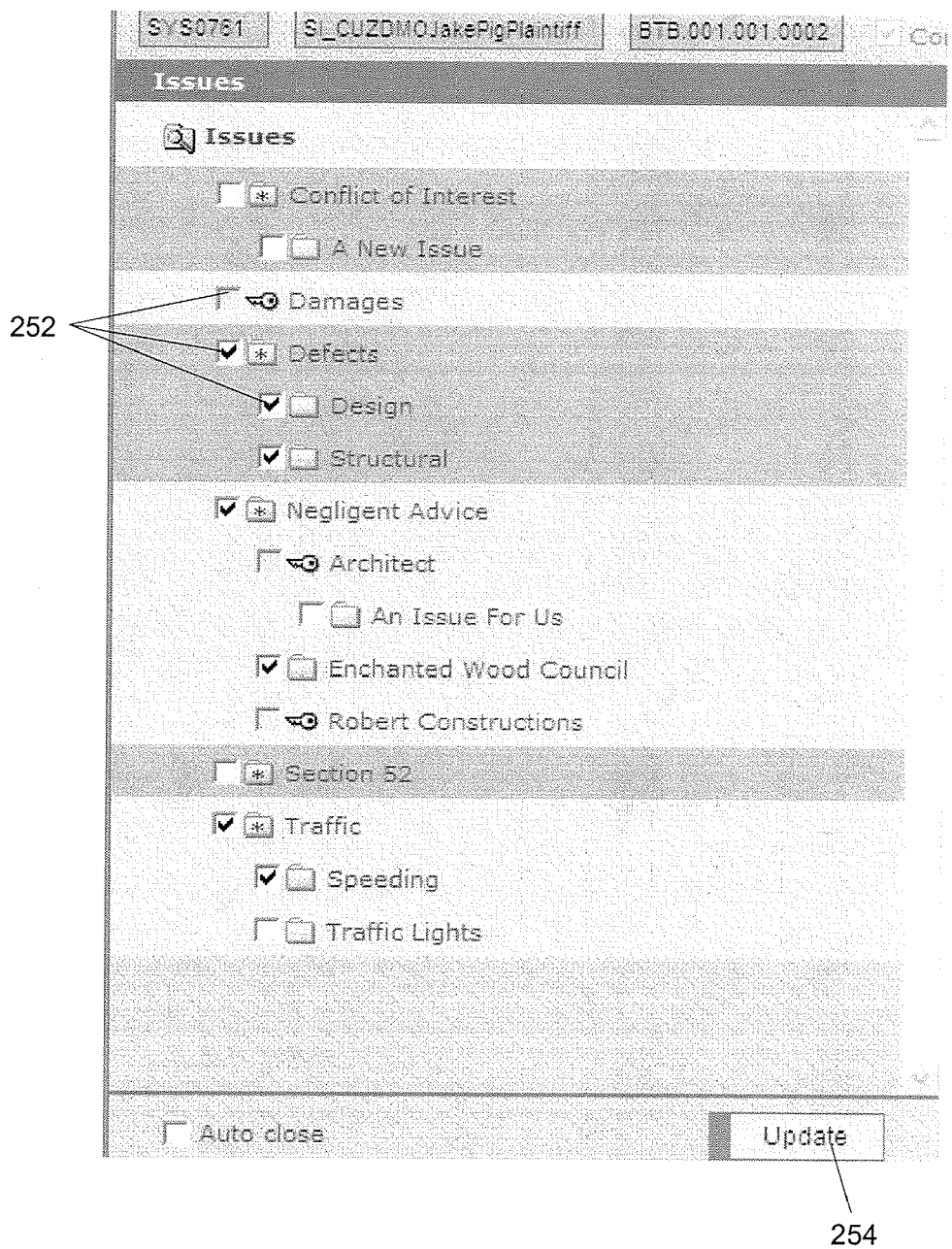

In this example issues have already been assigned to the document, including structural and negligence advice. By clicking the "+" 253 the pop up window of FIG. 8 is shown. The issues associated with the document can be changed by ticking or un-ticking the check boxes (some indicated at 252) and then clicking "update" 254. This returns the plaintiff to the interface shown in FIG. 6.

Tags 332 are an indication that a group of items have something in common and are in some way related. Using tags 332 is a good way to save search results, or group related items into a set. Tags can be used in combination with search criteria and the ordering function (described later).

Figure 9:
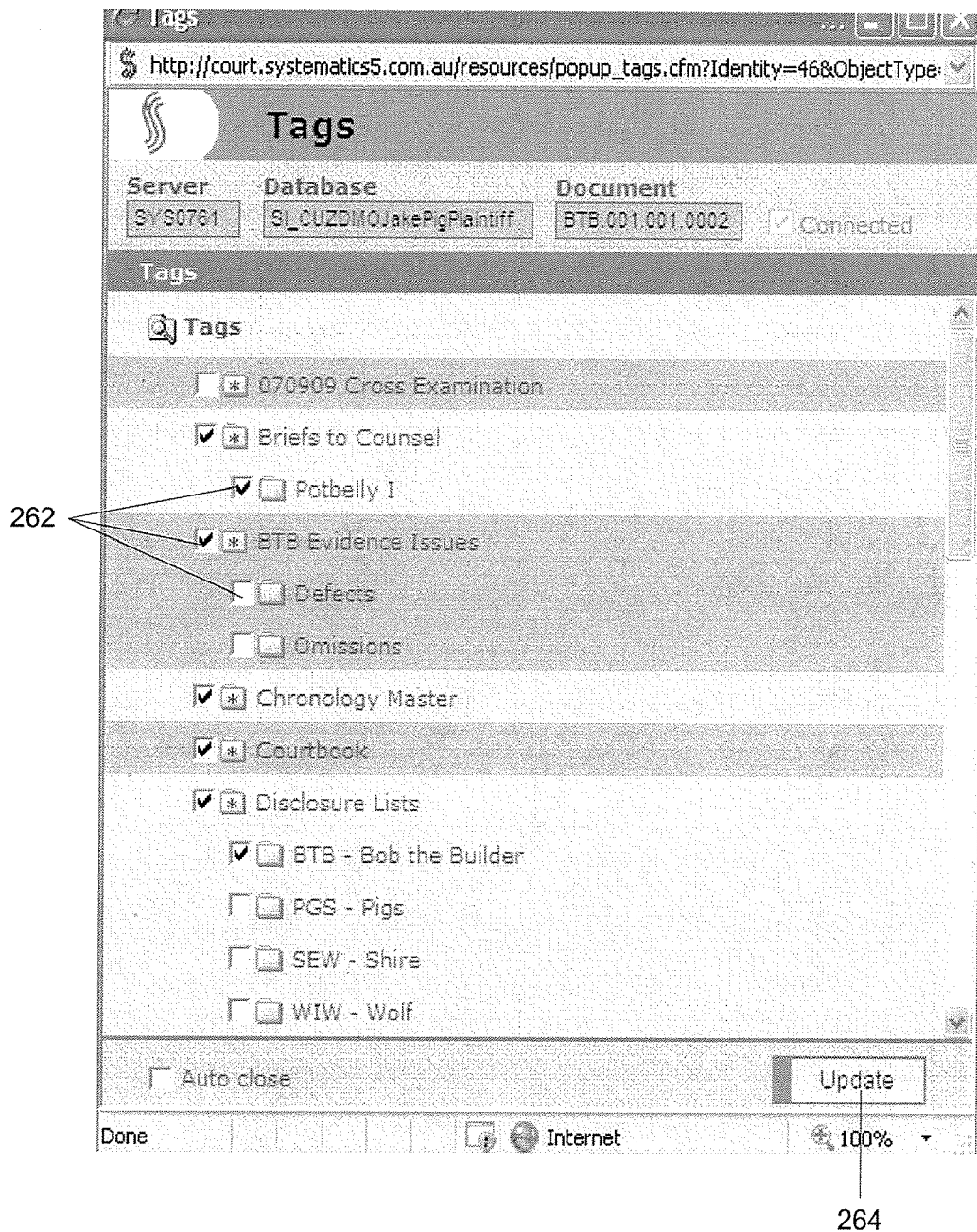

In this example tags Briefs to Counsel, Potbelly I, BTB Evidence Issues and Chronology Master have already been associated with this document. By clicking the "+" 260 the pop up window of FIG. 9 is shown. The issues associated with the document can be changed by ticking or un-ticking the check boxes (some indicated at 262) and then clicking "update" 264. This returns the plaintiff to the interface shown in FIG. 6.

Tags can also be bulk assigned to items 74. For example, by clicking "Bulk Assign" 270 a similar pop up box as shown in FIG. 9 will be displayed. The check boxes ticked or un-ticked will affect all 34 items that were results of the search as summarised at 224.

Figure 10:
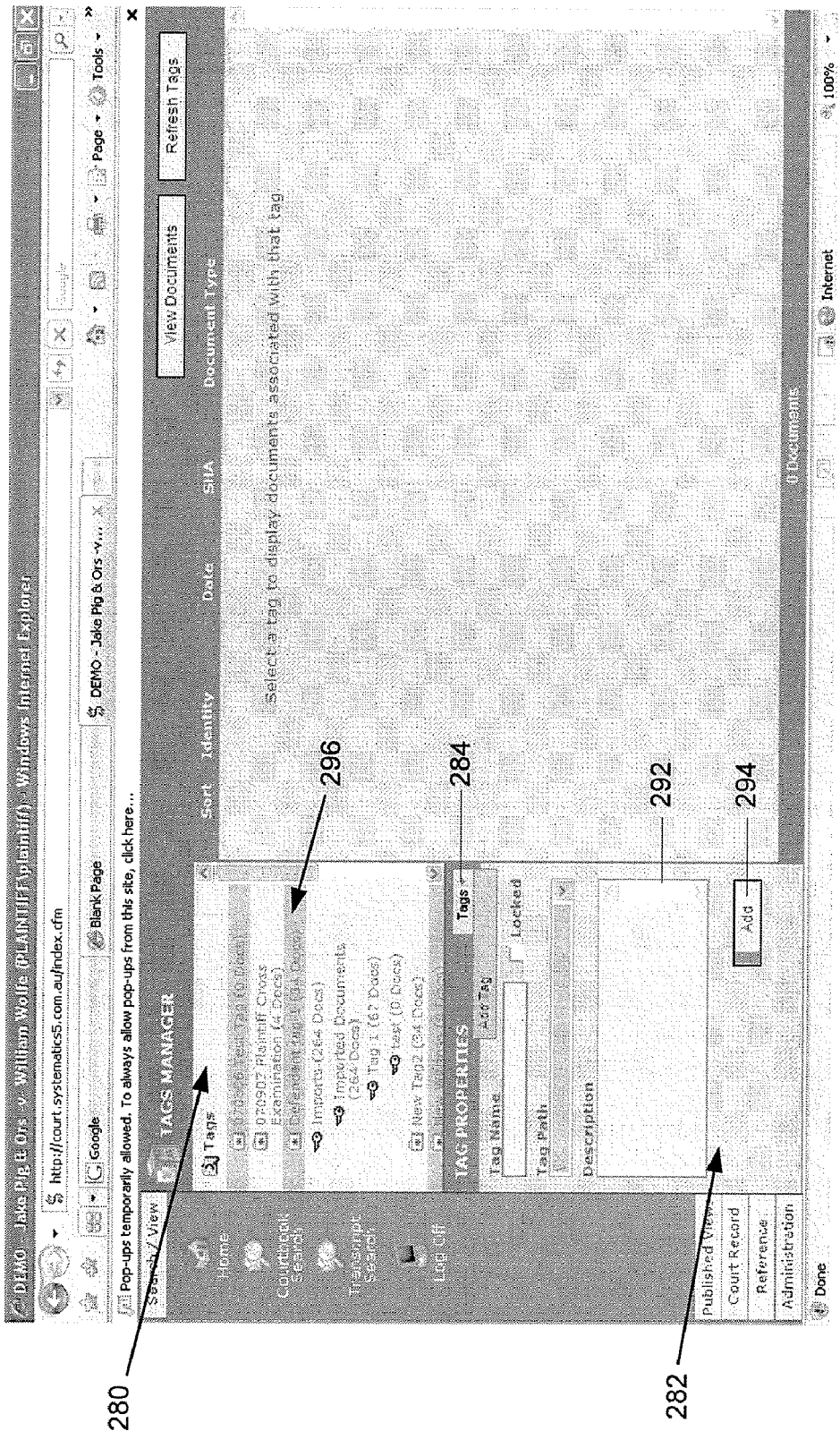
Figure 10B:
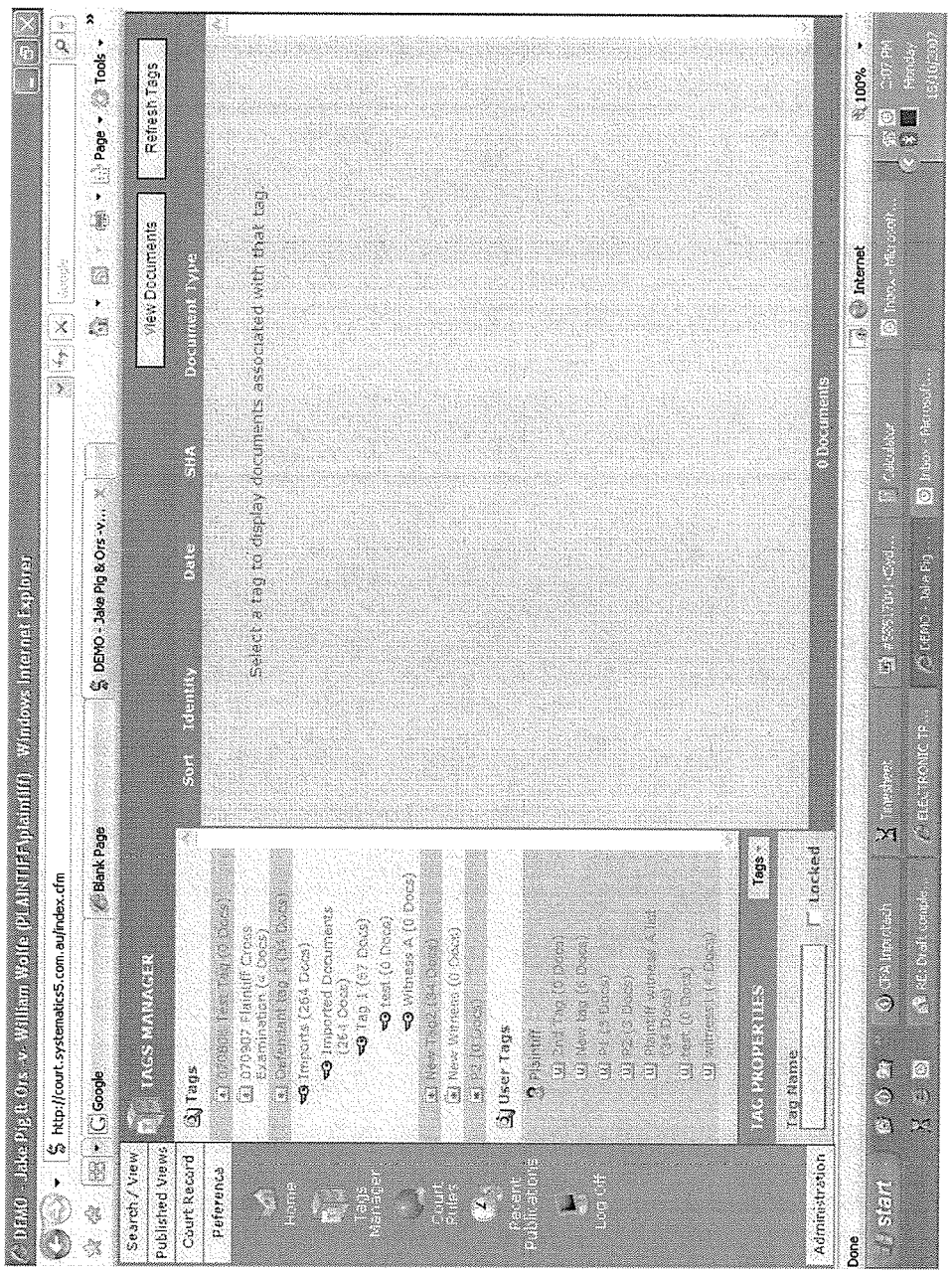

The private tags themselves are defined by the user. To create and manage existing tags the module "Reference" 274 is clicked and the interface shown in FIG. 10 is displayed. In the top left corner 280 a summary of the tags within their hierarchy are presented similarly to FIG. 8. This top left corner is best shown in FIG. 10(b). It can be seen that the tags are divided into public tags and user tags. In this example, the public tags are visible to all user's having access to this information, such as both legal teams and the Judge. The user tags are private to the user or team of users. The authorization of the Judge and the defendant's legal team will not allow them to view the private user tags of the legal team of the plaintiff.

Figure 11:
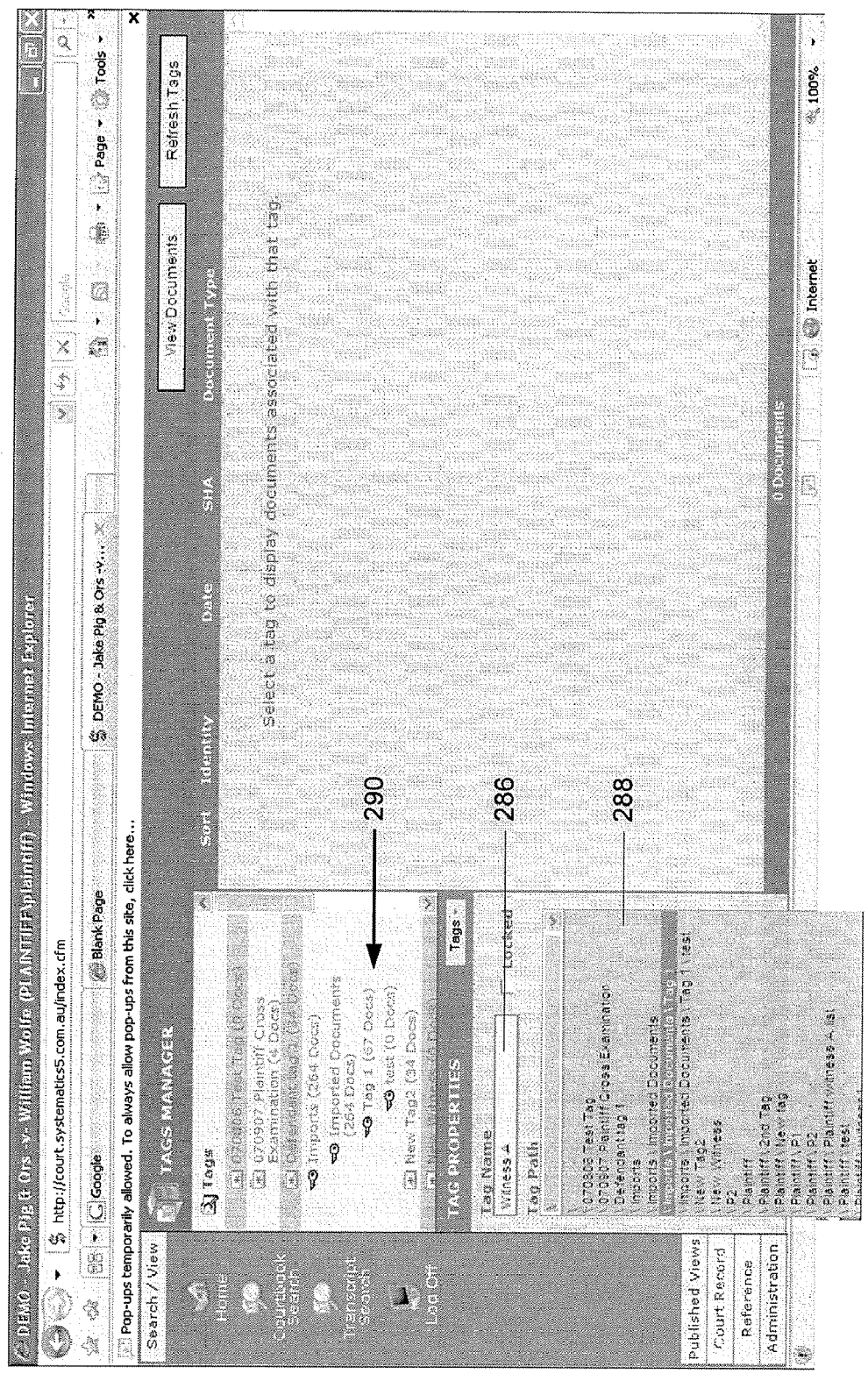

In the bottom left corner 282 tags can be added and managed. For example, by clicking "tags" 284 a new tag can be added. As shown in FIG. 11, this includes filing in the "Tag Name" field with the name of the tag, in this case "Witness A" 286. Next the location of new tag within the hierarchy is selected as shown at 288. The new tag is created to fit within the hierarchy under Tag 1 as indicated at 290. A text description of the tag can be entered into at 292 and "Add" 294 is clicked. This causes the new tag name "Witness A" to appear in hierarchy beneath 290.

Private information, including comments 228, issues 330, user tags 332 and annotated versions of documents can be stored 72 in either the local database 113(a), a shared private database 113(b) or the server 106. It can be stored anywhere that can be accessed by the server and presented on the interface of an authorised person both inside and outside the court room. The server 102 causes the private database 113(a) or 113(c) or and the data store 106 to be accessed when the users make information requests to ensure that all data, both public and private is accessible by the user on their interface. If the private information is stored in the data store 106 the information is stored within a separate database to prevent unauthorised access to the private information. In this example this authentication is driven from the unique user name and passwords of the users.

User teams of the legal representatives and the Judge can create and store private information in a private database.

Figure 12:
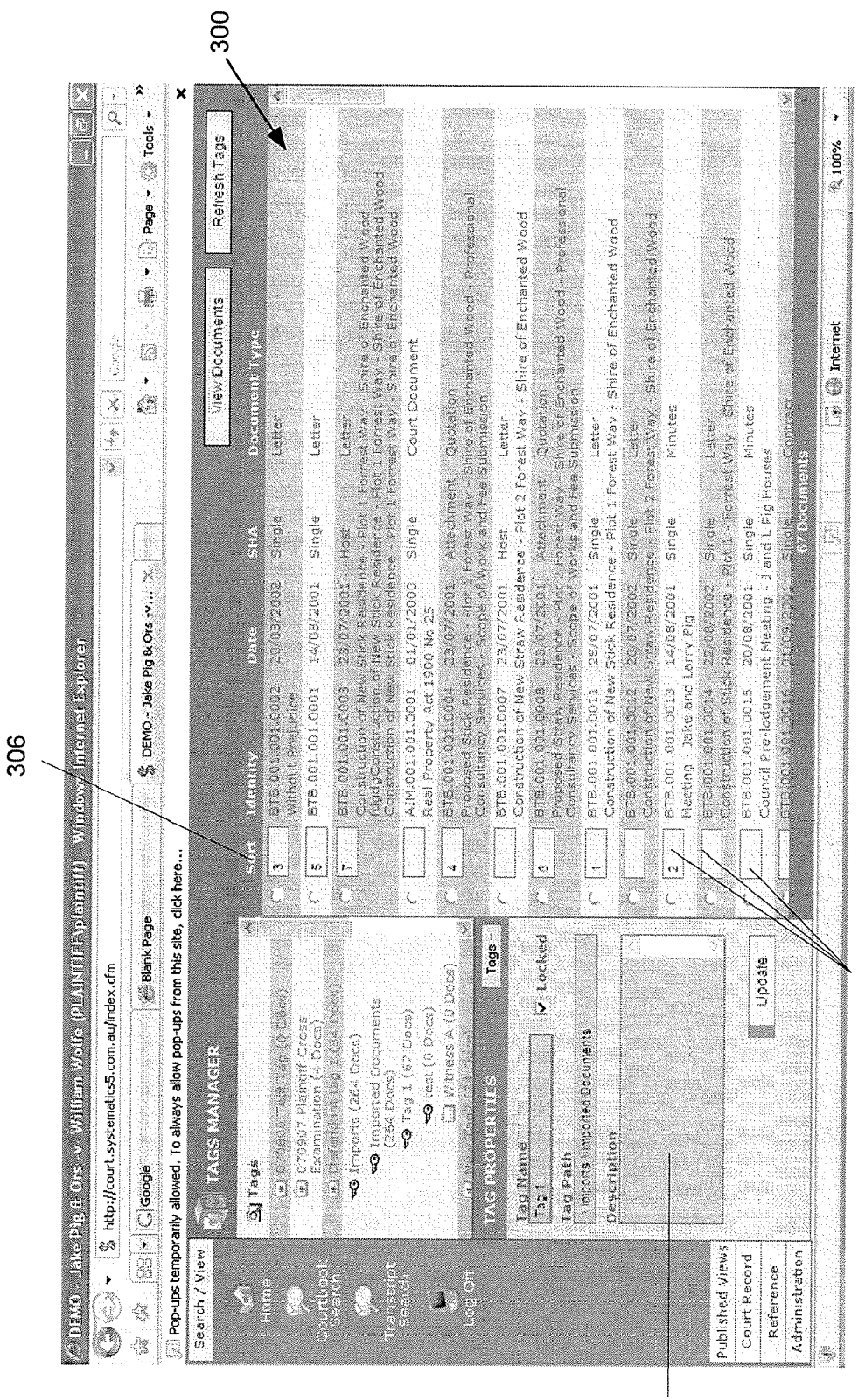

At some time before items of evidentiary information are referred to in the proceeding the plaintiff 111 may wish to organise sets of items in the sequences that they are intended for presentation to a witness or in anticipation of moving the admission of material as evidence 76. Referring again to FIG. 10, the tag "Tag 1" 296 is selected and the interface shown in FIG. 12 is then displayed to the plaintiff. In the right hand side 300 a summary of the set of items belonging to this tag is presented.

Figure 13:
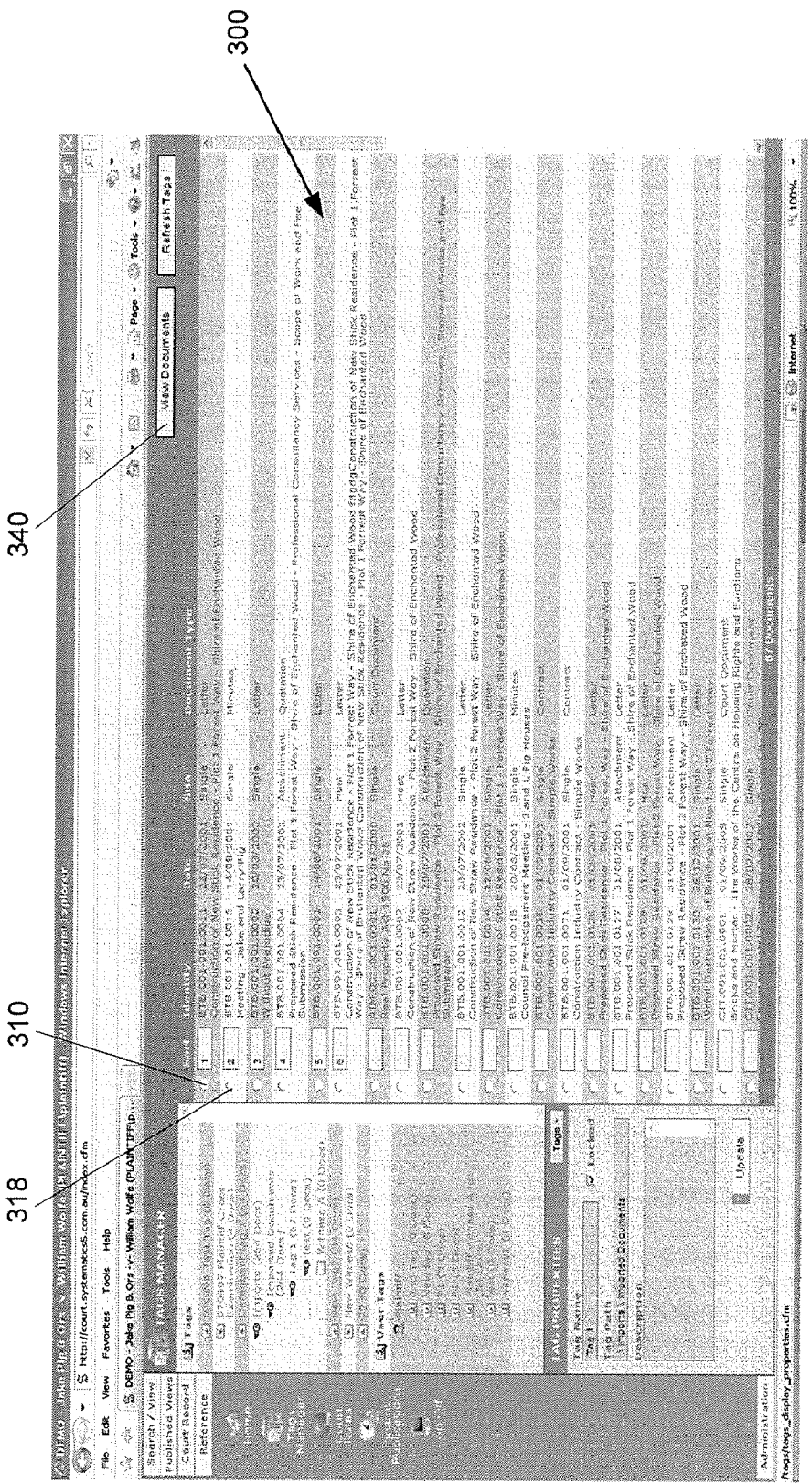

The plaintiff can now sort the items so that the set of items is re-ordered in the order that they will be referenced in court. In this example the plaintiff enters the numbers 1 to 6 in the text boxes (some labelled 302) under the heading "Sort" 306. These numbers reflect the anticipated order of use of the items by the plaintiff. Once the numbers are entered, the heading "Sort" 306 is clicked and this causes the summary of the set of items belonging to this tag to be presented in the nominated order as shown in FIG. 13. All items that were not given a number are then listed underneath the items having a defined order as shown in FIG. 12.

The unique username defines the particular access the user has to the information stored in the database and the functionalities that are available from their interface. Further, the use of usernames and passwords enable the creation of a team or set of users by predefining which users belong to the same team or set. Each user is identified by their username. In relation to each user:

- a witness is presented only the items that have been presented (i.e. published) to their interface. Using their interface they can manipulate a presented document just as if it was a hard copy, such as turning pages and rotating the document. They cannot see the associated public data.
- the Judge can receive published items and manipulate them just as the witness can but is also presented simultaneously on the interface the public data associated with the item such as the meta data and any of the Judicial team's private information. The Judge can also search for items and manage tags.
- legal practitioners have the same access as the Judge, however they can only view their own user team's private information.

In use, firstly the computer system of the courtroom must be set-up. Next, each user must then login to the server 102 in order to be presented with a computer generated interface. Any authorised user, most often a member of the Judicial team, may login into the server 102 on the witness' behalf. In some circumstances it is desirable to identify witnesses with personal user identities associated with the restricted user set "witnesses".

In this example the Judge is logged into the computer 114 and the Judge's private information is stored on the database 106. The witness is logged into computer 116 and has no private information. The plaintiffs legal team is logged into laptops 110 and their private information is stored on the database 113(c) which is accessed using the server 113(b) which is connected to the Internet. The defendant's legal team is logged into one or more laptops 112 and has the private information stored locally on one of the laptops and the laptops of the team.

Presentation of a document virtually hands that document, open at a page being referenced, to the recipient. Once the document has been presented in the interface the recipient, within the limits of his or her security definition, can deal with the evidence as if it had been found directly in the database or handed to the recipient in hard copy.

For the witness, this means being able to zoom, re-orient, turn pages and mark the document.

For the Judge, legal practitioner or other authorized participant this means being able deal with the item just as the witness can but also being able to read associated public data and make private notes and comments and to switch to view a private annotated version of the item.

In this Example "Tag 1" defines a set of items that will be referenced when questioning a witness by the plaintiff. During the questioning of the witness by Counsel for the plaintiff, the instructing solicitor of the plaintiff can request the items to be presented to the other users in the courtroom on their respective interfaces as the items are referenced.

Figure 14:
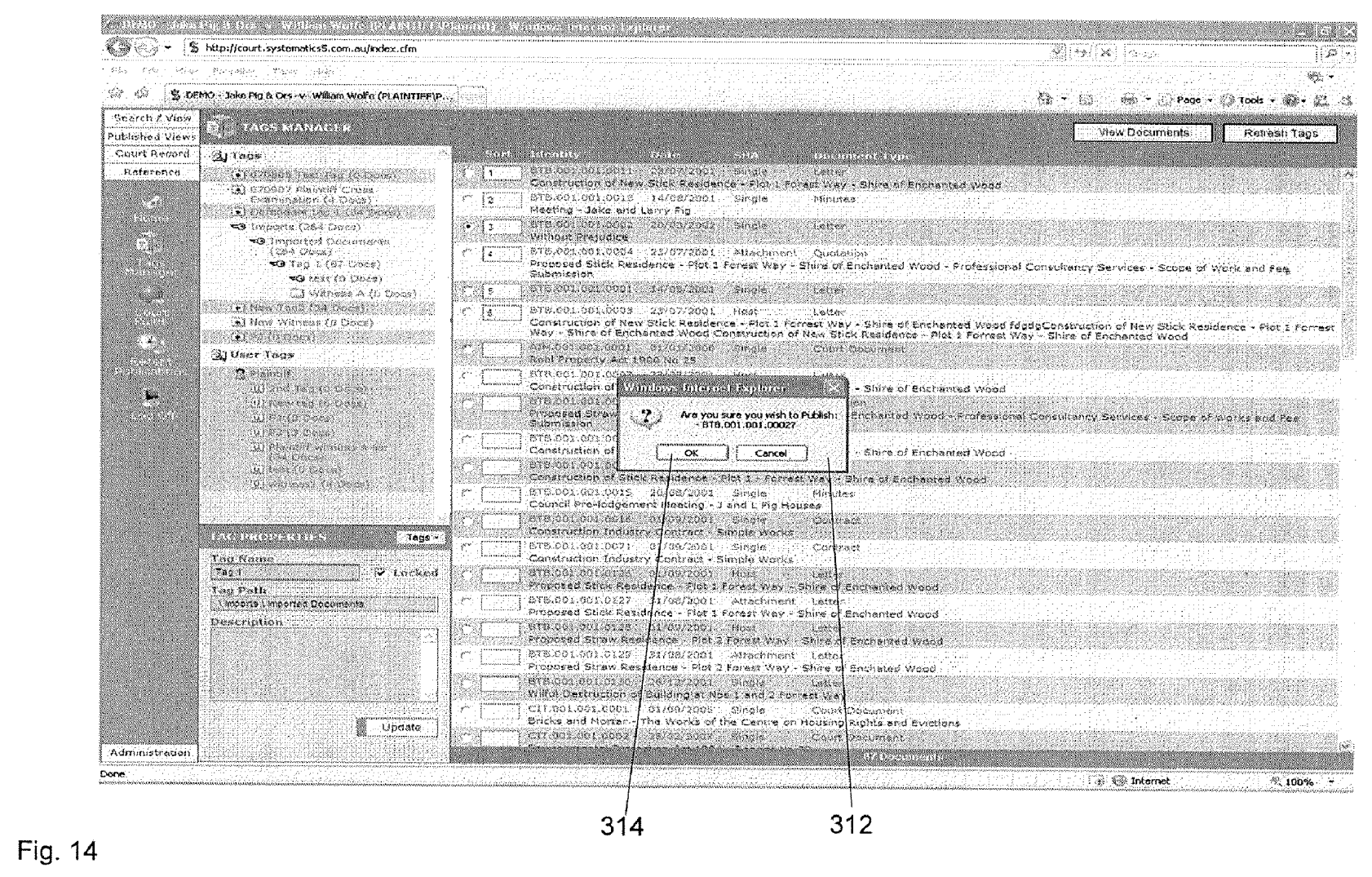
Figure 15:
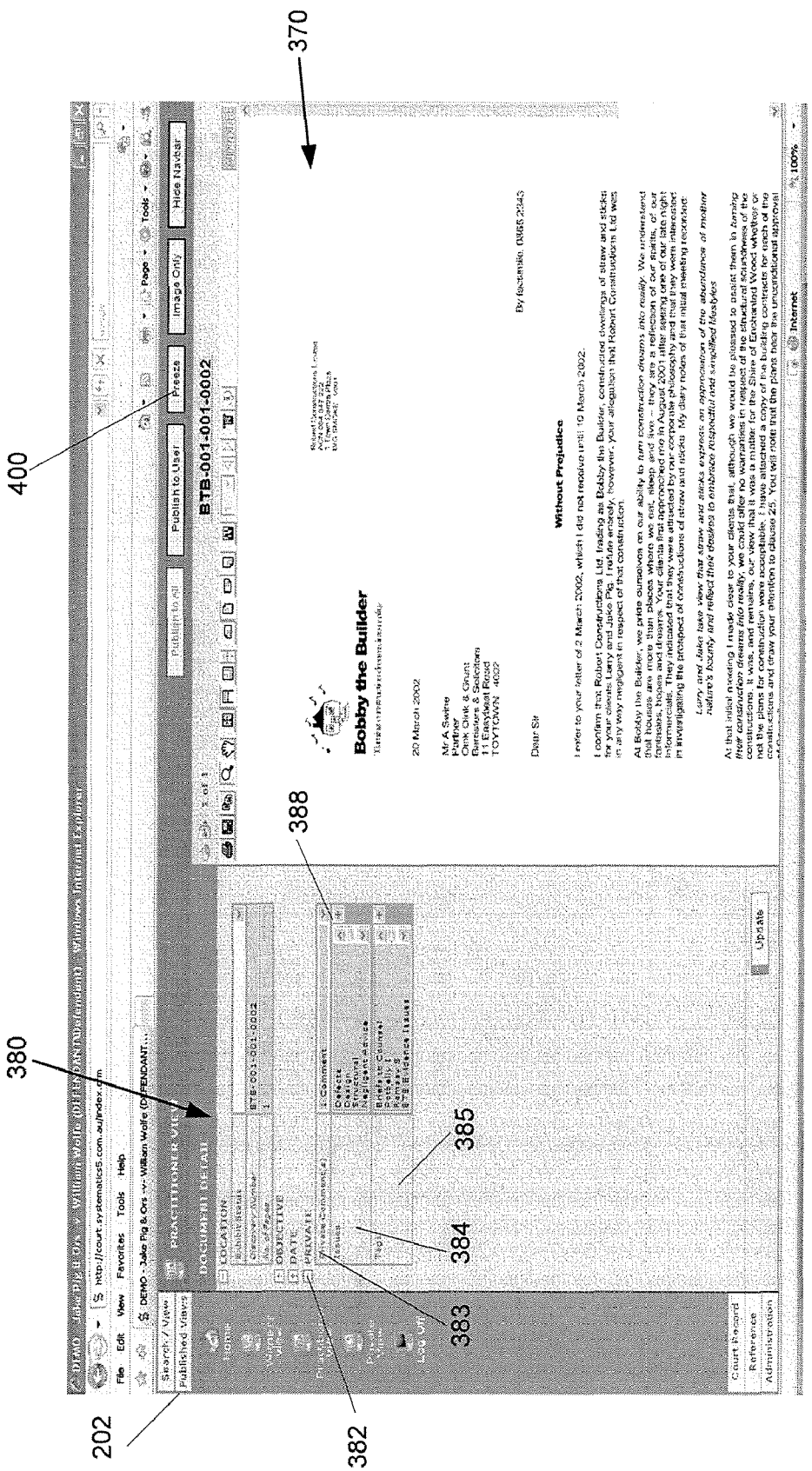

The plaintiff can make a presentation request using the interface shown in FIG. 13. As previously stated in the right hand side 300 a summary of the set of items belonging to this tag is presented 78. In this example, to publish an item the plaintiff solicitor simply clicks 80 the radio button (one labelled 310) next to that item. This causes the pop up window 312 shown in FIG. 14 to be displayed. By clicking OK 314, the "published views" 202 module now presents to every user accessing an interface in this case the graphic of the first document 82. The view of the defendant's "published view" is shown in FIG. 15.

The plaintiff instructing solicitor repeats these publication steps for the second item by clicking the radio button 318 80. Again, the pop up appears as shown in FIG. 14 and once "OK" 314 is clicked the "published views" presentation of FIG. 15 changes to present the graphic of the second document 82.

Figure 16:
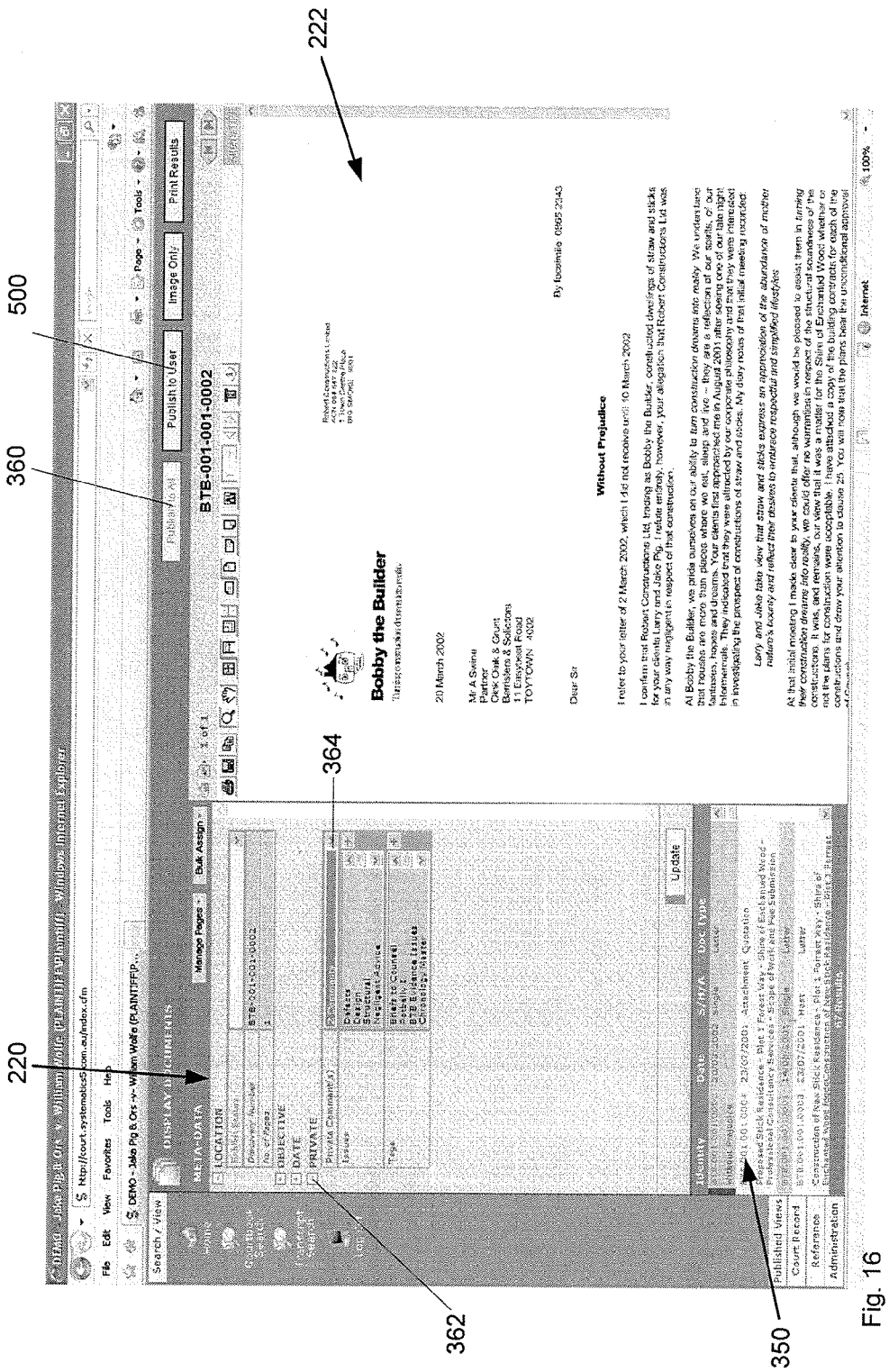

Alternatively the plaintiff instructing solicitor may choose to click "View Documents" 340. This causes the interface to change to appear as shown in FIG. 16 with a summary for the set of items 75 in the nominated order to appear in the bottom left hand corner 350. This allows the plaintiff to review the item before causing it to be presented on all other interfaces of the users. By clicking 80 "Publish to All" 360 the document in the list as presented on the right hand side 222 will be presented to all users 82.

The presenting of private information will now be described with reference to FIGS. 15 to 18. FIG. 16 shows the plaintiffs interface presenting the document with the unique identifier BTB-001-001-0002 at 222. As discussed in relation to FIG. 6, at 220 the meta data and the private information 362 is presented. In this example, the server 102 retrieves from the public database stored on 106 the graphic of the document and the meta data, including location, objective and date.

In order to present the private information of the plaintiff associated with this document including comments 228, issues 330 and tags 332 the server 102 must access the private information stored on the database 113(c) by communicating with the server 113(b) to retrieve the relevant information and make it available for presentation to the plaintiff.

Figure 17:
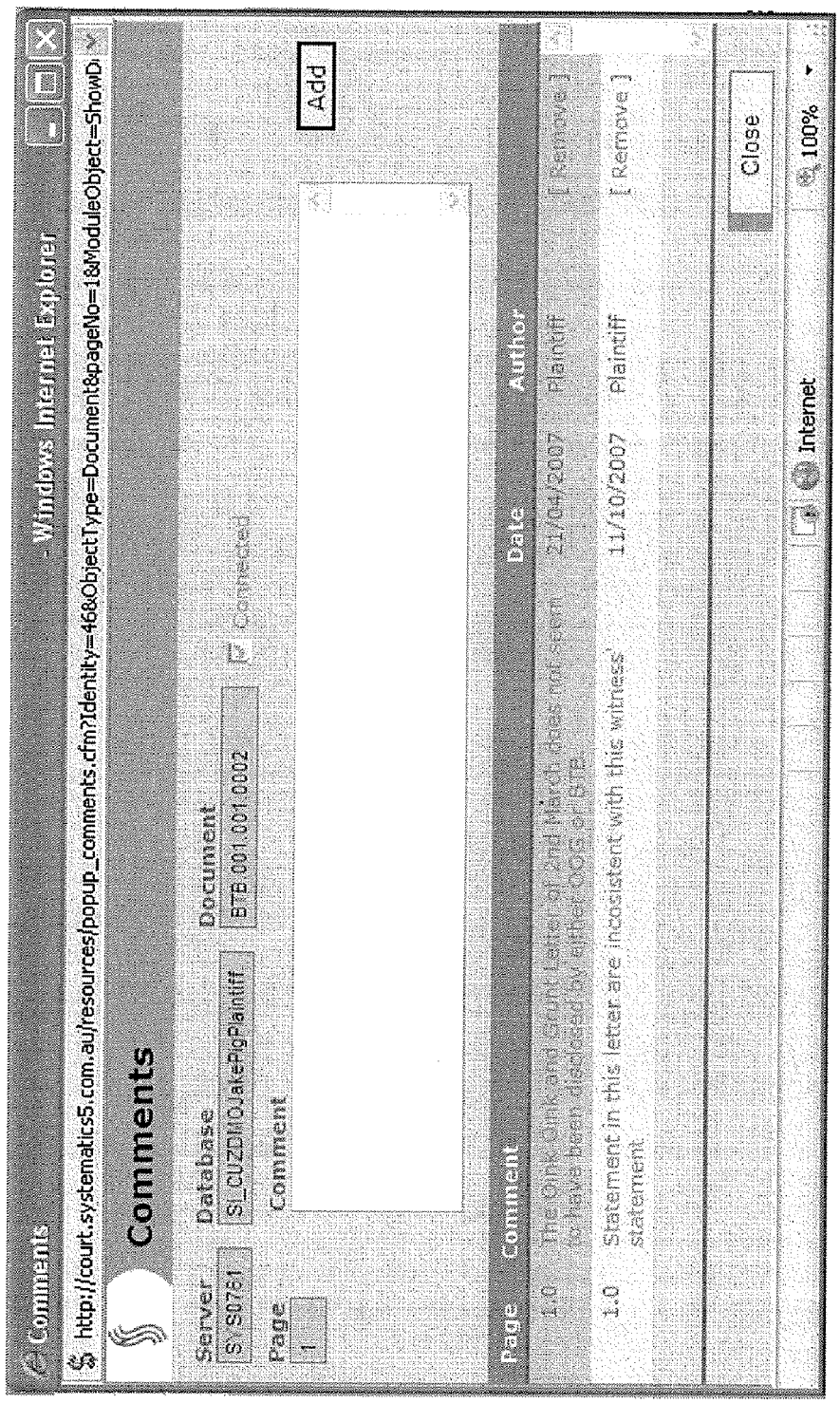

In this example, the plaintiffs private information as shown in 362 comprises two comments, a set of issues and a set of tags. By clicking on the 2 comments 364 the pop up box as shown in FIG. 17 appears.

This can be compared to the interface of the defendant presenting the same document as shown in FIG. 15. Here there is no summary at the left bottom corner as the presentation of the document 370 is based on a publication from another user rather than the defendant's selection from a search or "View Documents" request. Again, the same public meta data 380 of location, objection and date is presented to the defendant.

The defendant's private information 382 is also simultaneously presented next to the document. In order to present the private information of the defendant associated with this document including comments 383, issues 384 and tags 385 the server 102 must access the private information stored on the local storage of the defendant's laptop 112 to retrieve the relevant information and make it available for presentation to the defendant within the interface.

Figure 18:
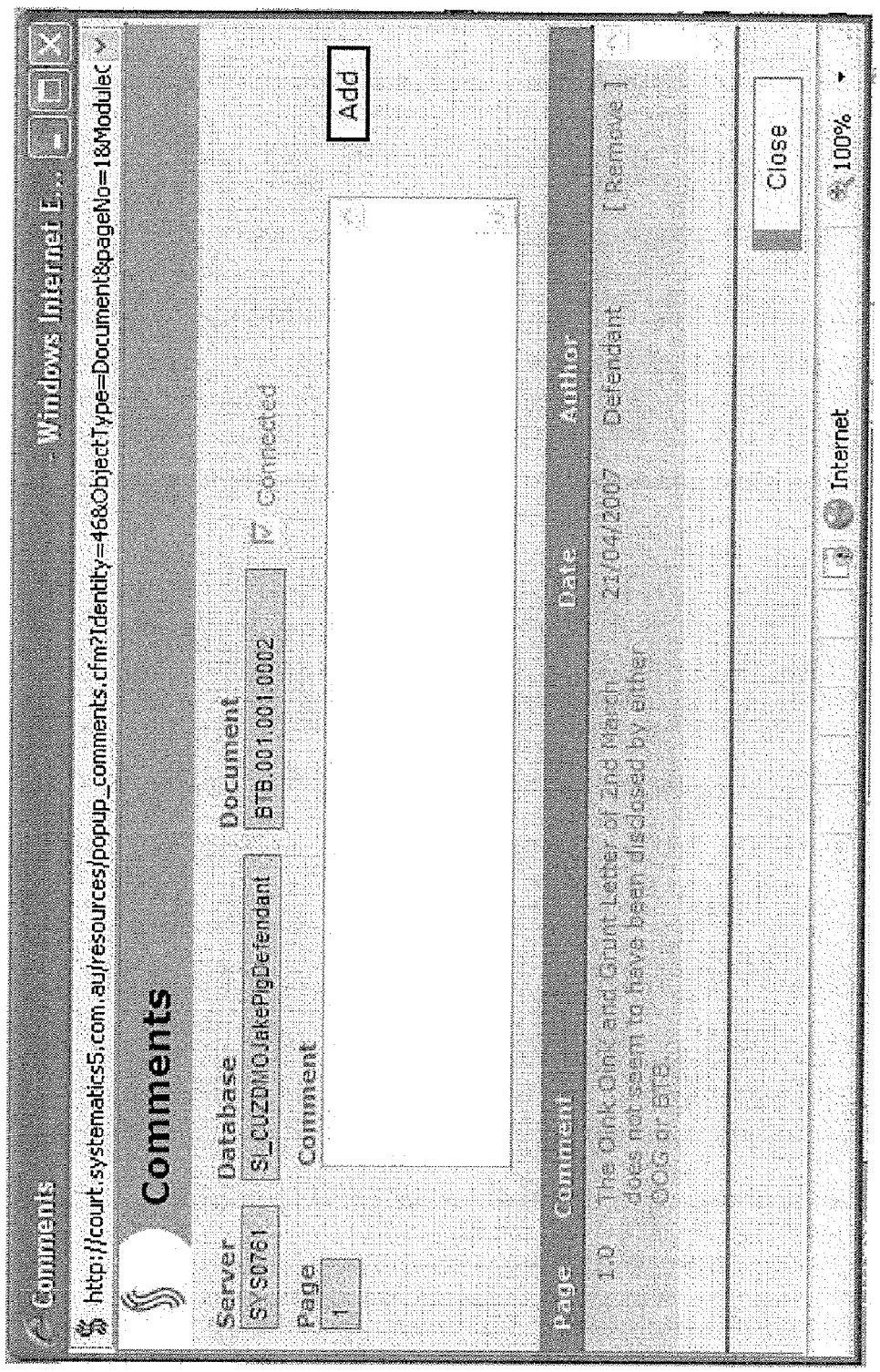

There is one comment associated with this document, and by clicking 388 the pop-up box shown in FIG. 18 appears.

It can be seen that the private information 382 of the defendant is different to the private information of the plaintiff. The comments shown in FIGS. 17 and 18 are different. The tags and issues are also different.

In some cases the private information may include a private version of the item. For example the defendant may have an annotated version of the document shown in FIG. 15 stored on their local data base containing the other private information. In this case the server 102 automatically checks the defendant's database to ensure that the private version is presented to the defendant in preference to the public version. Alternatively, an indication may be stored on the database 106 associated with the document indicating that a private version of this document is available in the defendant's private information. In this case the server 102 initially checks the database 106 for this indication before attempting to retrieve the private version from the defendant's local database.

While the same document is presented to all participants, this allows each user to receive data and alternative copies of the documents which are unique to their role and prior participation in the proceedings. Practically, this means that, without the need for a private search, questioning Counsel can be automatically delivered a highlighted version of the document with associated questions and comments while the Witness and Judge are concurrently virtually handed the registry's unmarked bald copy of the document.

The private version may also be preferred for presentation when the document is viewed as a result of a search.

The user may select which version of the item they wish to have presented, either as a predetermined setting for all or individual items. The interface may also allow the user to alter which version of the item that is presented while it is currently being presented allowing the user to easily switch between the two.

The ability to interact with published evidence may create a condition where a legal practitioner will wish to continue reading, analysing or commenting on an item of evidence currently being discussed and presented while the court moves on to address a subsequent item of evidence.

In this example, the plaintiff may wish to publish the next document in the list, however the defendant solicitor wishes to continue reading the document presented on the interface shown in FIG. 15. To do this the defendant clicks 84 "Freeze" 400. When the plaintiff next clicks "OK" 314 or "Publish to All" 360 in relation to a different document the presentation of the graphic of the document 370 will not accept the new document and will remain unchanged.

The freeze function also facilitates a witness being asked to compare documents or any other user that wishes to compare documents. The witness and/or practitioners can "Freeze" 400 the current document and open a second window to receive a second document. Additional Internet browser windows can be opened and a new interface displayed within it that can accept the next published document or can present the document located by a search using that interface. This is the technological equivalent of asking the witness to retain one item of evidence while being handed a second item of evidence, to examine both and respond to questions comparing the two.

As a further feature, where an interface has presented two or more documents the user, the user may click a "Previous" button (not shown) to navigate back to a previously presented document.

It is also possible to restrict publication to an individual user or a defined set of users. For example, Counsel might ask an instructing solicitor, who might be in the courtroom or remotely located, to locate a document unexpectedly required in evidence. The found document can then be presented privately to Counsel making the request. Once satisfied the document found is that required Counsel can on-publish the document limiting the publication to the Judge and opposing Counsel with a view to obtaining the Judge's authority to put the document to the Witness.

Figure 19:
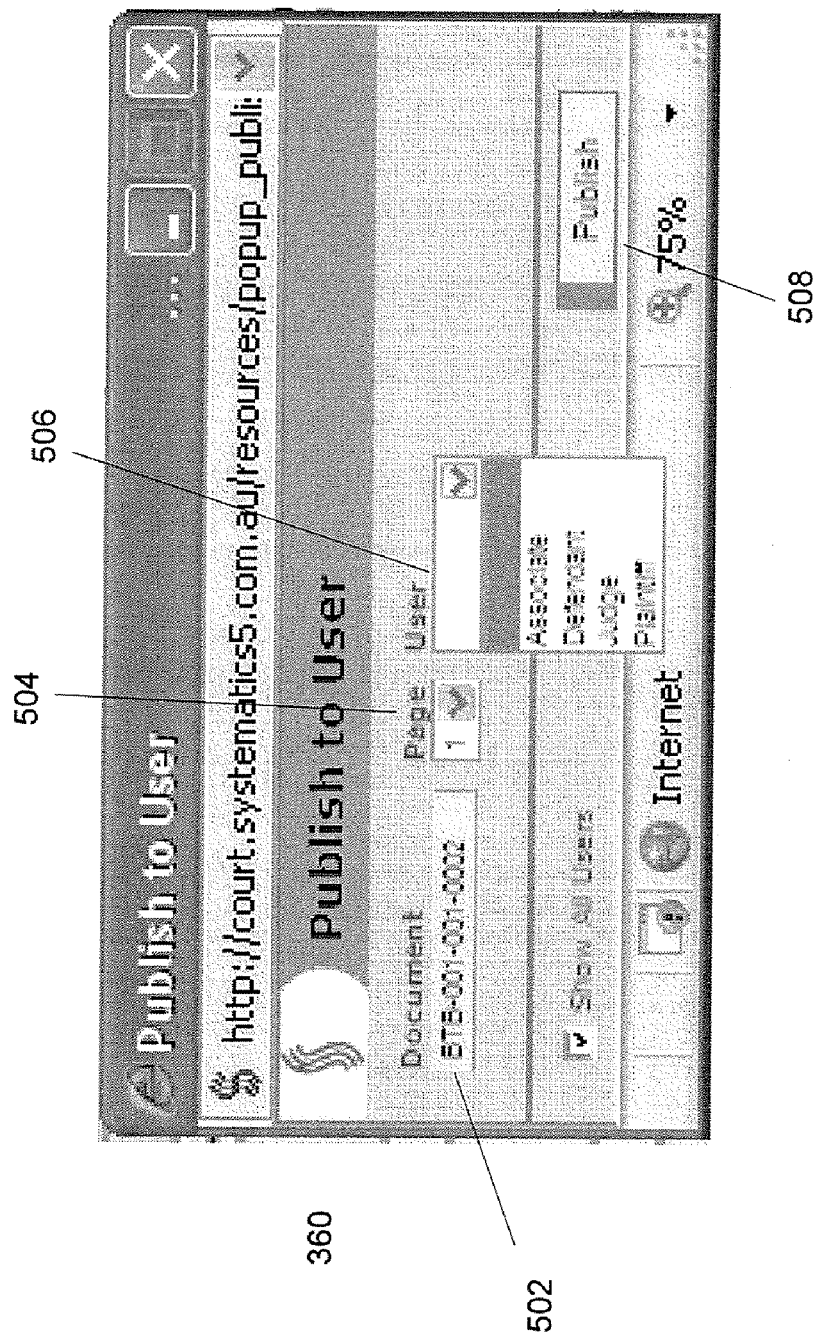

Referring to FIG. 16, to do this the plaintiff solicitor must have a document presented in the interface at 222, such as from the result of a search. Next the plaintiff clicks "Published to User" 500 and the pop-up box shown on FIG. 19 is presented 86. The document that was presented at 222 is identified by the unique identifier at 502. Next, the plaintiff must select which page 504 of the document should be presented and the name of the user 506 that plaintiff wishes to publish to 506. In this case the plaintiff selects "plaintiff" which selects every user in the plaintiffs legal team. Alternatively, the list can also identify individual users for selection.

Next the plaintiff clicks publish 508 and the document is presented on the interface of Counsel that is not "frozen".

Once that Judge's authorisation has been obtained, the Judge or Counsel or the Instructing Solicitor can on-publish the document publicly to the Witness and all other participants by clicking "Publish All" 360.

Advantages of embodiments of the invention include:

enhance the quality and reduce the cost of legal practice and process, delivering benefits to both legal practitioners and their clients.

helps meet the requirements of Counsel for presentation of evidence.

The party making submissions or questioning can control publication and be confident the correct item will be quickly presented.

Hearings accelerate as the instructing solicitor anticipates the item being called rather than Counsel reciting the item number and waiting for an operator to search, retrieve and present the item.

The need for and cost of a dedicated courtroom operator is eliminated.

Subject to the control of the Judge and allocated system security rights, any person, Instructing Solicitor, Counsel, Judge or even the witness can assume the traditional operator role at any time.

It will be appreciated by persons skilled in the art that numerous variations and/or modifications may be made to the invention as shown in the specific embodiments without departing from the spirit or scope of the invention as broadly described.

For example, there may be more users in the court room. The Judge may also have an associate that is also given a username and password. The Judge's associate is given the same access levels as the Judge but can operate their interface independently to the Judge. Also there may be a separate computer to drive an interface for the jury.

The computers 110 to 116 may be replaced with slave display screens. In this case a single computer is connected to each of these display screens that can perform the local processing for each display 110 to 116.

The present embodiments are, therefore, to be considered in all respects as illustrative and not restrictive.

The invention claimed is:

1. A computer system to provide a set of computer generated interfaces for presenting evidentiary information to users of a secure user group, wherein each and every one of the computer generated interfaces are operable to receive a request from a user to present one or more items of evidentiary information, the computer system comprising:

a data store to store a set of items of evidentiary information and an indication of the order of the items within the set; and a processor to access the data store to send to all the interfaces a summary of the set of items to receive a request via any one of the interfaces to present one or more of the items, and following receipt of a request to present one or more of the items, to access the data store to automatically send the one or more items to the interfaces of all the users of the secure user group for presentation.

2. A computer system according to claim 1, wherein the processor further operates to receive a request from any one of the interfaces for a tag to be associated with an item.

3. A computer system according to claim 1, wherein the processor further operates to receive an indication of the order of the items within the set from any one of the interfaces.

4. A computer system according to claim 1, wherein a separate request is received to present an item for each item in the set.

5. A computer system according to claim 1, wherein the user group is secured by authentication of each user using a password and user name, wherein authentication determines whether a respective interface is able to receive a request to present the items.

6. A computer system according to claim 1, wherein the interface is a website.

7. A method of presenting evidentiary information to a secure user group on a set of computer generated interfaces, wherein each and every one of the computer generated interfaces are operable to receive a request from a user to present one or more items of evidentiary information, comprising the steps of:

storing in a first data store an item of evidentiary information;

storing in the first data store or a second data store first private information of a first user relating to the item and associating the first private information with the item;

wherein on request via one of the interfaces to present simultaneously the item to the first user and a second user;

retrieving the item from the first data store;

retrieving the first private information from the first or second data store;

sending at least the first private information to the interface of the first user for presentation using the interface; and sending the item to the interface of the second user for presentation using the interface.

8. A method according to claim 7, wherein the private information is an annotated version of the item and/or observations relating to the item.

9. A method according to claim 7, wherein the method further comprises the step of sending the item to the first user.

10. A method according to claim 7, wherein the second data store is remote from the first data store, and the step of retrieving the first private information comprises retrieving the first private information from the remote second data store using an Internet connection.

11. A method according to claim 7, wherein the method further comprises determining whether the first private information is an annotated version of the item and if so, selecting the annotated version for presentation on the interface.

12. A method according to claim 7, wherein the method further comprises storing in the first data store or a third data store second private information of the second user relating to the item and associating the second private information with the item;

wherein following a request to present the item to the first user and the second user simultaneously, retrieving the second private information from the first or third data store; and sending the second private information to the second user for presentation using the interface.

13. A method according to claim 7, wherein the first and second user each comprise a plurality of users having a separate interface.

14. A method according to claim 7, wherein the method further comprises authenticating the user, wherein the authentication determines the requests an interface of the user can receive, items the interface of the user can present and private information the interface of the user can present.

* * * * *